United States Patent
Li et al.

(10) Patent No.: US 10,030,182 B2
(45) Date of Patent: Jul. 24, 2018

(54) PRESSURE SENSITIVE ADHESIVES BASED ON FATTY ACIDS

(71) Applicant: State of Oregon acting by and through the State Board of Higher Education on behalf of Oregon State University, Corvallis, OR (US)

(72) Inventors: Kaichang Li, Corvallis, OR (US); Anlong Li, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 1027 days.

(21) Appl. No.: 14/363,785

(22) PCT Filed: Dec. 5, 2012

(86) PCT No.: PCT/US2012/067973
§ 371 (c)(1),
(2) Date: Jun. 6, 2014

(87) PCT Pub. No.: WO2013/086012
PCT Pub. Date: Jun. 13, 2013

(65) Prior Publication Data
US 2014/0345797 A1  Nov. 27, 2014

Related U.S. Application Data

(60) Provisional application No. 61/568,097, filed on Dec. 7, 2011.

(51) Int. Cl.
*C09J 7/38* (2018.01)
*C09J 163/00* (2006.01)
(Continued)

(52) U.S. Cl.
CPC ............ *C09J 163/00* (2013.01); *B32B 37/02* (2013.01); *B32B 37/1284* (2013.01);
(Continued)

(58) Field of Classification Search
USPC ...... 156/249, 307.1, 307.3, 307.7, 325, 330, 156/332
See application file for complete search history.

(56) References Cited

U.S. PATENT DOCUMENTS 2,682,515 A     7/1952  Naps
2,863,845 A  *  12/1958 Magne ................ C08K 5/35
                                                   106/316
(Continued)

FOREIGN PATENT DOCUMENTS

WO  WO 2004/056901    7/2004
WO  WO 2007/140102    12/2007
(Continued)

OTHER PUBLICATIONS

Keles et al., "Autooxidized Polyunsaturated Oils/Oily Acids: Post-it Applications and Reactions with FE(III) and Adhesion Properties," Macromol. Symp. 269: 154-160, 2008.

*Primary Examiner* — Sing P Chan
(74) *Attorney, Agent, or Firm* — Klarquist Sparkman, LLP

(57) ABSTRACT

A method for making a pressure sensitive adhesive comprising:
(a) making at least one epoxidized fatty acid from at least one plant oil, marine oil, other ester of unsaturated fatty acid, or a mixture thereof; and
(b) polymerizing the at least one epoxidized fatty acid to produce a pressure sensitive adhesive.
A method for making a pressure sensitive adhesive comprising:
(a) making epoxidized oleic acid, an epoxidized linoleic acid (including fully and partially epoxidized linoleic acid), or an epoxidized linolenic acid (including fully and partially epoxidized linolenic acid) from at least
(Continued)

one plant oil, marine oil, other ester of unsaturated fatty acid, or making mixture thereof; and (b) polymerizing the epoxidized oleic acid, the epoxidized linoleic acid, the epoxidized linolenic acid, or the mixture thereof to produce a pressure sensitive adhesive.

30 Claims, 1 Drawing Sheet

(51) Int. Cl.
- *B32B 37/02* (2006.01)
- *B32B 37/12* (2006.01)
- *C08G 59/36* (2006.01)
- *C08G 59/42* (2006.01)
- *C09F 7/02* (2006.01)

(52) U.S. Cl.
CPC ............ *C08G 59/36* (2013.01); *C08G 59/42* (2013.01); *C09F 7/02* (2013.01); *C09J 7/38* (2018.01); *B32B 2305/74* (2013.01); *B32B 2309/02* (2013.01); *B32B 2317/24* (2013.01); *B32B 2405/00* (2013.01); *C09J 2463/00* (2013.01); *C09J 2463/008* (2013.01); *Y10T 428/2891* (2015.01)

(56) References Cited

U.S. PATENT DOCUMENTS

| | | |
|---|---|---|
| 2,944,035 A | 7/1960 | Wear |
| 4,119,640 A | 10/1978 | Hodakowski et al. |
| 4,980,397 A | 12/1990 | Rao et al. |
| 5,308,887 A * | 5/1994 | Ko .............................. C09J 4/00 428/446 |
| 5,973,082 A | 10/1999 | Elmore |
| 2004/0185283 A1 | 9/2004 | White et al. |
| 2005/0250923 A1 | 11/2005 | Palmese et al. |
| 2009/0326099 A1* | 12/2009 | Tazzia ................... C08G 59/00 523/402 |
| 2010/0041794 A1 | 2/2010 | Earls et al. |
| 2012/0059087 A1* | 3/2012 | Koch .................... C09J 163/00 523/414 |
| 2013/0078464 A1 | 3/2013 | Li |

FOREIGN PATENT DOCUMENTS

| | | |
|---|---|---|
| WO | WO 2008/088624 | 7/2008 |
| WO | WO 2008/144703 | 11/2008 |
| WO | WO 2011/156378 | 12/2011 |
| WO | WO 2012/024301 | 2/2012 |
| WO | WO 2013/086004 | 6/2013 |
| WO | WO 2013/086014 | 6/2013 |

* cited by examiner

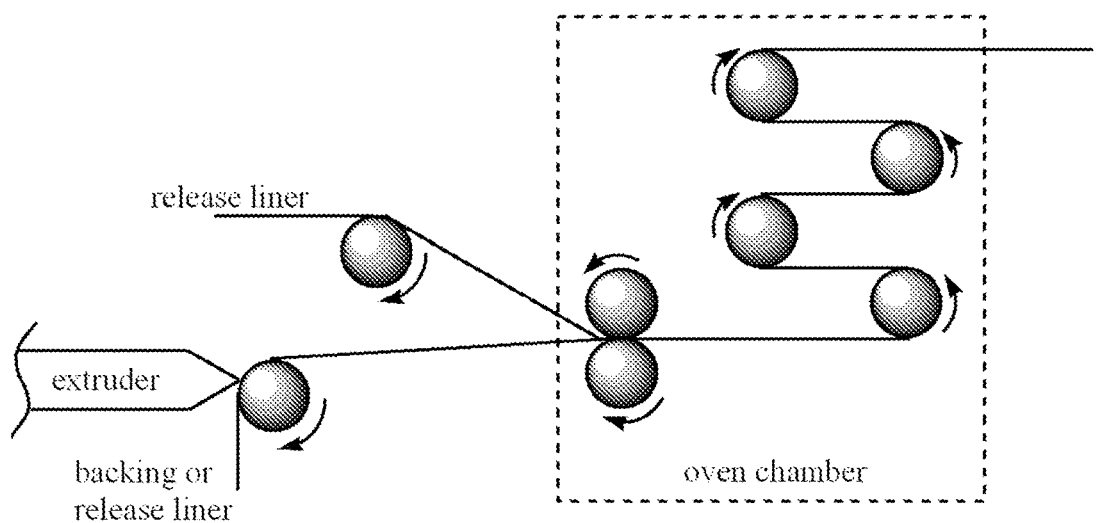

PRESSURE SENSITIVE ADHESIVES BASED ON FATTY ACIDS

CROSS REFERENCE TO RELATED APPLICATION

This is the U.S. National Stage of International Application No. PCT/US2012/067973, filed Dec. 5, 2012, which was published in English under PCT Article 21(2), which in turn claims the benefit of U.S. Provisional Application No. 61/568,097, filed Dec. 7, 2011, which is incorporated herein in its entirety.

BACKGROUND

Pressure sensitive adhesive (PSA) (also known as "self adhesive" or "self stick adhesive") is adhesive which forms a bond at room temperature with a variety of dissimilar surfaces when light pressure is applied. No solvent, heat or radiation is needed to activate the adhesive. It finds wide applications in pressure-sensitive tapes, general purpose labels, post-it notes, postage stamps, and a wide variety of other products, e.g., packaging, automobile trim assembly, sound/vibration damping films, maternity and child care products like diapers, and hospital and first aid products like wound care dressings.

Nowadays, most commercially available PSAs are usually based on elastomeric materials compounded with optionally suitable tackifiers and waxes. The elastomeric materials are basically based on petrochemicals such as acrylics or modified acrylics, butyl rubber, silicone rubbers, ethylene-vinyl acetate copolymers, nitriles, vinyl ethers, and styrene block copolymers (e.g., SBS, SEBS, SEP and SIS). Tackifiers like C-5 and C-9 resins, and waxes, are usually low molecular weight polymers or oligomers which are also derived from petroleum streams. However, non-renewable petroleum is being depleted at a fast pace. On the other hand, many petrochemical-based polymers are not biodegradable, and their disposals after their useful life create serious environmental pollution. Therefore, it is desirable to provide PSA compositions that can be made from renewable natural materials; and it is highly desirable that the manufacture and use of PSA do not generate environmental pollution.

Plant oils are one of the most abundant and least expensive renewable raw materials, among which soybean oil is one of the most attractive. More than 20 billion pounds of soybean oils are produced annually in the United States, however, no higher than 600 million pounds of them are used for industrial application. Therefore, development of economically feasible new industrial products from plant oils is also highly desirable, especially from soybean oil which is facing a combination of a large annual surplus (with frequent carry-over exceeding 1 billion pounds) and the paucity of increased non-food uses for it. Plant oil is mainly a mixture of triglycerides with varying composition of long-chain saturated and unsaturated fatty acids depending on the plant, the crop, and the growing conditions. The double bonds in unsaturated fatty acids can be converted into more reactive oxirane moieties (epoxy functional groups) by appropriate reactions. Epoxidized plant oils such as epoxidized soybean oil (ESO) are commercially available and are well used in rubbers, plastics, resins, coatings, and various thermosetting composites.

The use of plant oils as starting materials for making PSAs has numerous advantages such as low cost, low toxicity, inherent biodegradability, and fairly high purity. Several general approaches for making PSAs from vegetable oils have been disclosed (see, e.g., WO 2008/144703). In the first approach, free-radically polymerizable functional groups such as acrylate or methacrylate groups are first introduced onto fatty acid, fatty esters or vegetable oils and then polymerized via a free radical polymerization method such as ultraviolet radiation to form PSAs. The introduction of the functional groups is typically accomplished through the reaction between epoxidized fatty esters or epoxidized oils and acrylic acid/methacrylic acid. During the polymerization, various acrylic or methacrylic monomers may be used to co-polymerize with acrylated fatty acids or esters or acrylated vegetable oils. In this approach, petrochemical-based acrylate is still used, and the procedure is complex and time-consuming. This approach is considered as an extension of traditional free radical polymerization methods of making petrochemical-based PSAs. In the second approach, fatty ester or vegetable oils are first epoxidized. The epoxidized fatty esters or epoxidized vegetable oils are then polymerized to form PSAs through cationically catalyzed ring-opening polymerization of the epoxy rings. Some other epoxidized compounds may be copolymerized with epoxidized fatty esters or epoxidized vegetable oils for improving the properties of PSAs. The third approach involves the direct polymerization of carbon-carbon double bonds on fatty acids, fatty esters or vegetable oils with other free-radically polymerizable compounds such as acrylate or methacrylate. Unlike those in drying oils such as Tung oil, most carbon-carbon double bonds in vegetable oils are not conjugated, thus having relatively low reactivity during the free radical polymerization. In this third approach, fatty acids, fatty esters or vegetable oils have to be modified to form conjugated double bonds before the free radical polymerization.

SUMMARY

Disclosed herein is a method for making a pressure sensitive adhesive comprising:
(a) making at least one epoxidized fatty acid from at least one plant oil, marine oil, other ester of unsaturated fatty acid, or a mixture thereof; and
(b) polymerizing the at least one epoxidized fatty acid to produce a pressure sensitive adhesive.

In certain embodiments, a mixture of epoxidized fatty acids are made in step (a).

Further disclosed herein is a method for making a pressure sensitive adhesive comprising:
(a) making epoxidized oleic acid, an epoxidized linoleic acid (including fully and partially epoxidized linoleic acid), or an epoxidized linolenic acid (including fully and partially epoxidized linolenic acid) from at least one plant oil, marine oil, other ester of unsaturated fatty acid, or making mixture thereof; and
(b) polymerizing the epoxidized oleic acid, the epoxidized linoleic acid, the epoxidized linolenic acid, or the mixture thereof to produce a pressure sensitive adhesive.

Also disclosed herein are pressure sensitive adhesives and pressure sensitive adhesive constructs made by the above-disclosed methods.

In one embodiment, there is disclosed a method for making a pressure sensitive adhesive construct comprising:
making at least one epoxidized fatty acid from at least one plant oil, marine oil, other ester of unsaturated fatty acid, or a mixture thereof; and
forming on a backing substrate a pressure sensitive adhesive from the resulting at least one epoxidized fatty acid.

In another embodiment there is disclosed a method for making a pressure sensitive adhesive construct comprising:

making epoxidized oleic acid, an epoxidized linoleic acid (including fully and partially epoxidized linoleic acid), or an epoxidized linolenic acid (including fully and partially epoxidized linolenic acid) from at least one plant oil, marine oil, other ester of unsaturated fatty acid, or making mixture thereof; and forming on a backing substrate a pressure sensitive adhesive from the resulting epoxidized oleic acid, epoxidized linoleic acid, epoxidized linolenic acid, or mixture thereof.

Further disclosed herein is a pressure sensitive adhesive comprising a cross-linked hydroxyl-functional polyester obtained by reacting (i) at least one epoxidized fatty acid and, optionally, (ii) (a) at least one epoxide compound having at least two epoxy groups or (b) at least one carboxylic acid compound having at least two carboxylic acid groups. In certain embodiments, the at least one epoxidized fatty acid is made from at least one plant oil, marine oil, other ester of unsaturated fatty acid, or a mixture thereof. For example, the epoxidized fatty acid may be an epoxidized oleic acid, an epoxidized linoleic acid (including fully and partially epoxidized linoleic acid), or an epoxidized linolenic acid (including fully and partially epoxidized linolenic acid).

Also disclosed herein is a method comprising applying the pressure sensitive adhesive disclosed herein to a first substrate and then adhesively bonding the pressure sensitive adhesive-applied first substrate to a second substrate.

The foregoing will become more apparent from the following detailed description, which proceeds with reference to the accompanying FIGURES.

BRIEF DESCRIPTION OF THE DRAWINGS

FIG. 1 illustrates a combination of reactive extrusion and reactive calendar for the preparation of PSA and PSA constructs as disclosed herein.

DETAILED DESCRIPTION

As used herein, the singular terms "a," "an," and "the" include plural referents unless context clearly indicates otherwise. Also, as used herein, the term "comprises" means "includes."

The term "aliphatic" is defined as including alkyl, alkenyl, alkynyl, halogenated alkyl and cycloalkyl groups as described above. A "lower aliphatic" group is a branched or unbranched aliphatic group having from 1 to 10 carbon atoms.

The term "alkyl" refers to a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is a saturated branched or unbranched hydrocarbon having from 1 to 10 carbon atoms. Preferred alkyl groups have 1 to 4 carbon atoms. Alkyl groups may be "substituted alkyls" wherein one or more hydrogen atoms are substituted with a substituent such as halogen, cycloalkyl, alkoxy, amino, hydroxyl, aryl, or carboxyl.

The term "aryl" refers to any carbon-based aromatic group including, but not limited to, phenyl, naphthyl, etc. The term "aryl" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorous. The aryl group can be substituted with one or more groups including, but not limited to, alkyl, alkynyl, alkenyl, aryl, halide, nitro, amino, ester, ketone, aldehyde, hydroxy, carboxylic acid, or alkoxy, or the aryl group can be unsubstituted.

The term "cycloalkyl" refers to a non-aromatic carbon-based ring composed of at least three carbon atoms. Examples of cycloalkyl groups include, but are not limited to, cyclopropyl, cyclobutyl, cyclopentyl, cyclohexyl, and the like. The term "heterocycloalkyl group" is a cycloalkyl group as defined above where at least one of the carbon atoms of the ring is substituted with a heteroatom such as, but not limited to, nitrogen, oxygen, sulfur, or phosphorous.

"Heteroalkyl" means an alkyl group wherein at least one carbon atom of the otherwise alkyl backbone is replaced with a heteroatom, for example, O, S or N.

Prepolymers, as described herein, may be reaction product mixtures after pre-polymerization but prior to (further) polymerization and curing reaction. The reaction mixtures can consist of polymers of a wide spectrum of molecular weights. Oligomers have a low degree of polymerization (relatively low molecular weight). Prepolymer mixtures can include or consist of oligomers.

Disclosed herein is the polymerization of AB-type monomers derived from plant oils—the AB-type monomer is a single molecule incorporating both epoxy and carboxylic acid groups, for new PSA compositions, and the preparation of PSA products thereof. The AB-type monomers are preferably a mixture of epoxidized fatty acids derived from plant oils, marine oils or other esters of unsaturated fatty acids (including but not limited to monoglycerides and/or diglycerides of unsaturated fatty acids; unsaturated fatty acid methyl ester; animal fats like tallow, butterfat, and lard; artificial fats like Olestra which is an artificial fat created from sucrose and fatty acids). They can be prepared via epoxidization of plant oils followed by saponification of epoxidized plant oils thereof and acidification of the saponified products, or via saponification and acidification of plant oils to give a mixture of unsaturated fatty acids followed by epoxidization of the mixture. The mixture of epoxidized fatty acids can be used as starting materials without further purification, with an optionally added (i) at least one carboxylic acid compound bearing at least two carboxylic acid functional groups, or (ii) at least one epoxide bearing at least two epoxy groups, to produce PSAs and make PSA products thereof. In practice, the mixture of epoxidized fatty acids and optionally at least one carboxylic acid compound bearing at least two carboxylic acid functional groups is pre-polymerized to a degree that cross-linking does not obviously occur and the viscosity of the intermediate reaction mixture is appropriate to allow coating, followed by curing the intermediate reaction mixture at elevated temperatures to produce PSAs and make PSA products.

In certain embodiments, the presently disclosed PSAs are based on epoxidized fatty acids containing at least one internal epoxy group and are appropriately cross-linked for final PSA applications. No solvents, tackifiers, waxes or processing oils are needed for manufacture or use of the PSAs. The polymers of the PSA composition are branched polymers which usually exhibit a low $T_g$ (e.g., slightly lower than −20° C. for PSA samples based on epoxidized oleic acid). A $T_g$ of below or about room temperature is one of the criteria for the polymer compositions to be used as PSAs. For example, the $T_g$ of the PSAs disclosed herein may be from −100 to 50° C., preferably from −80 to 40° C., more preferably from −50 to 30° C. It should be noted that, $T_g$ of the PSAs should be fine-tuned to meet various demands of final PSA products. For example, preferred PSAs for use in low peel labels will have a $T_g$ of from −50 to −30° C. Preferred PSAs for use in freezer labels will have a $T_g$ of from −45 to −30° C. Preferred PSAs for use in cold temperature labels will have a $T_g$ of from −25 to −10° C. Preferred PSAs for use in PSA tapes will have a $T_g$ of from −10 to 10° C. Preferred PSAs for use in high peel labels will have a $T_g$ of from 0 to 10° C. Preferred PSAs for use in disposables will have a $T_g$ of from 10 to 30° C. Furthermore, in certain embodiments, the PSA compositions consist of, or consist essentially of, a mixture of epoxidized fatty acids prepared from plant oils, marine oil, or other esters of unsaturated fatty acids (e.g., via epoxidation and saponification of plant oils followed by acidification of the saponified products), that does not require purification for use as PSA compositions and thus is of competitively low cost.

Disclosed herein are new pressure sensitive adhesive (PSA) compositions based on epoxidized fatty acid(s) derived from plant oils, marine oils, or other esters of unsaturated fatty acids, and methods for the preparation of PSA compositions and PSA tapes or other PSA products thereof. The final PSA compositions generally possess low glass transition temperature, sufficient cohesive strength, and good initial tack and adhesive powder. In addition, they are odorless and made without using organic solvents, and in most of the embodiments originate from only renewable raw materials.

In some embodiments, a mixture of epoxidized fatty acids prepared from plant oils, marine oil, or other esters of unsaturated fatty acids and optionally (i) at least one carboxylic acid compound bearing at least two carboxylic acid functional groups, or (ii) at least one epoxide having at least two epoxy groups, is pre-polymerized to a degree that cross-linking does not obviously occur and the viscosity of the intermediate reaction mixture is appropriate to allow coating, followed by further polymerizing and/or curing the of intermediate reaction mixture at elevated temperatures to produce PSAs and make PSA products. In additional embodiments, a mixture of epoxidized fatty acids prepared from plant oils, marine oil, or other esters of unsaturated fatty acids is first pre-polymerized to a degree that cross-linking does not obviously occur, then co-polymerizing the prepolymer with (i) at least one carboxylic acid compound having at least two carboxylic acid groups or (ii) at least one epoxide having at least two epoxy groups, to a degree that cross-linking does not obviously occur and the viscosity of the intermediate reaction mixture is appropriate to allow coating, followed by further polymerizing and/or curing of the intermediate reaction mixture at elevated temperatures to produce PSAs and make PSA products. For example, the viscosity should be no higher than 2,000,000 mPa·s, preferably no higher than 200,000 mPa·s, more particularly no higher than 100,000 mPa·s, at operating temperatures and stirring speeds.

In other embodiments, a mixture of (a) epoxidized oleic acid (EOA), an epoxidized linoleic acid (including fully and partially epoxidized linoleic acid), or an epoxidized linolenic acid (including fully and partially epoxidized linolenic acid), or mixtures thereof, and optionally (b) at least one epoxide bearing at least two epoxy groups or one carboxylic acid compound bearing at least two carboxylic acid groups, is pre-polymerized to a degree that cross-linking does not obviously occur and the viscosity of the intermediate reaction mixture is appropriate to allow coating, followed by further polymerizing and/or curing of the intermediate reaction mixture at elevated temperatures (i.e., greater than room temperature) to produce PSAs and making PSA products. In additional embodiments, EOA, an epoxidized linoleic acid (including fully and partially epoxidized linoleic acid), or an epoxidized linolenic acid (including fully and partially epoxidized linolenic acid), or mixtures thereof, is first pre-polymerized to a degree that cross-linking does not obviously occur, then co-polymerizing the prepolymer with (i) at least one carboxylic acid compound having at least two carboxylic acid groups or (ii) at least one epoxide having at least two epoxy groups, to a degree that cross-linking does not obviously occur and the viscosity of the intermediate reaction mixture is appropriate to allow coating, followed by further polymerizing and/or curing of the intermediate reaction mixture at elevated temperatures (i.e., greater than room temperature) to produce PSAs and make PSA products. For example, the viscosity should be no higher than 2,000,000 mPa·s, preferably no higher than 200,000 mPa·s, more particularly no higher than 100,000 mPa·s, at operating temperatures and stirring speeds. An embodiment of the process is shown below schematically. The cross-linked hydroxy-functional polyester product is a main component of the PSA compositions (e.g., the polyester constitutes at 50 weight percent of a PSA composition, based on the total weight of the PSA composition).

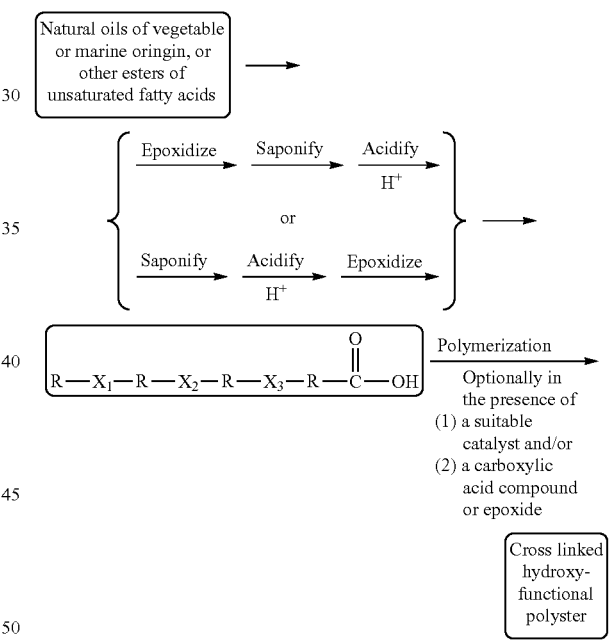

wherein $X_1$, $X_2$, and $X_3$ each independently represent

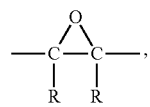

or a substituted or unsubstituted alkyl or heteroalkyl group; and each R independently represents hydrogen or a substituted or unsubstituted alkyl or heteroalkyl group.

The cross-linked polyesters can consist of the following units or blocks which can link with each other to form an ester group:

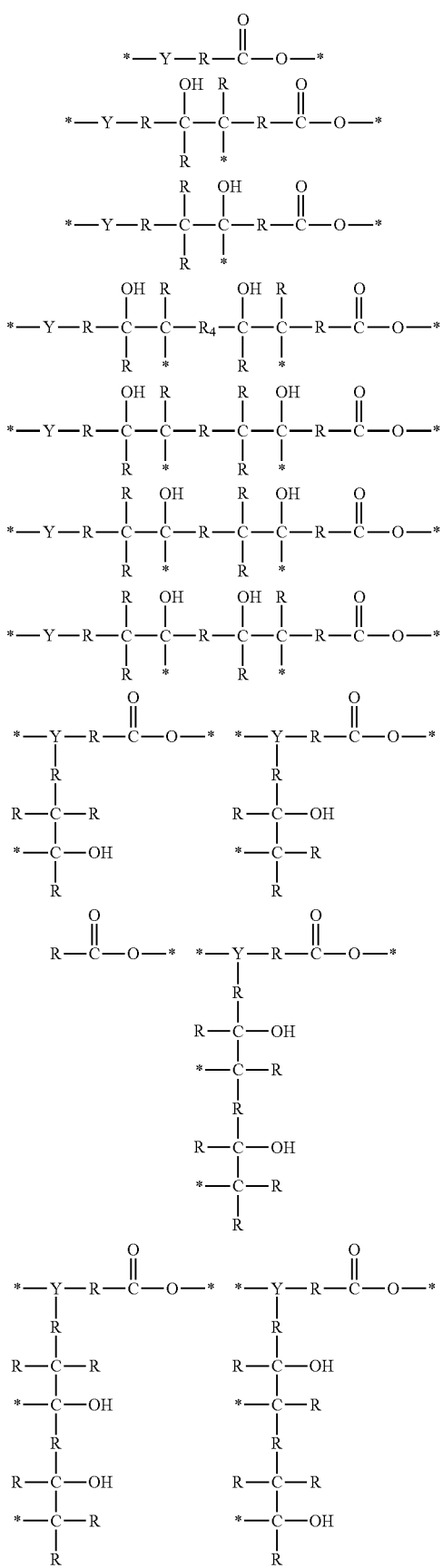

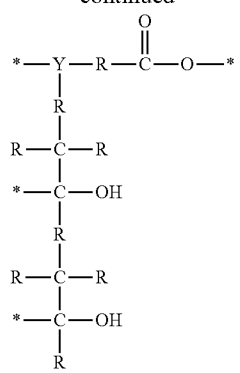

wherein each R independently represents hydrogen or a substituted or unsubstituted alkyl or heteroalkyl group; and Y independently represents

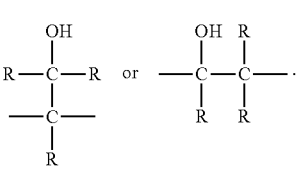

If a carboxylic acid compound bearing at least two carboxylic acid functional groups is added and polymerized with the epoxidized fatty acid or the mixture of epoxidized fatty acids, the following units/blocks can also occur in the polyesters in addition to those described above:

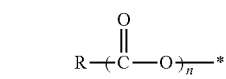

(wherein n is an integer greater than 1; and R represent a substituted or unsubstituted alkyl or heteroalkyl group).

If an epoxide bearing at least two epoxy groups is added and polymerized with the epoxidized fatty acid or the mixture of epoxidized fatty acids, the following units/blocks can also occur in the polyesters in addition to those described previously:

(wherein n is an integer greater than 1; Y is defined above, R represents a substituted or unsubstituted alkyl or heteroalkyl group, and each of $R_1$ independently represents hydrogen or a substituted or unsubstituted alkyl or heteroalkyl group).

A representative example of preparing cross-linked polyester derived from soybean oil is illustrated below:

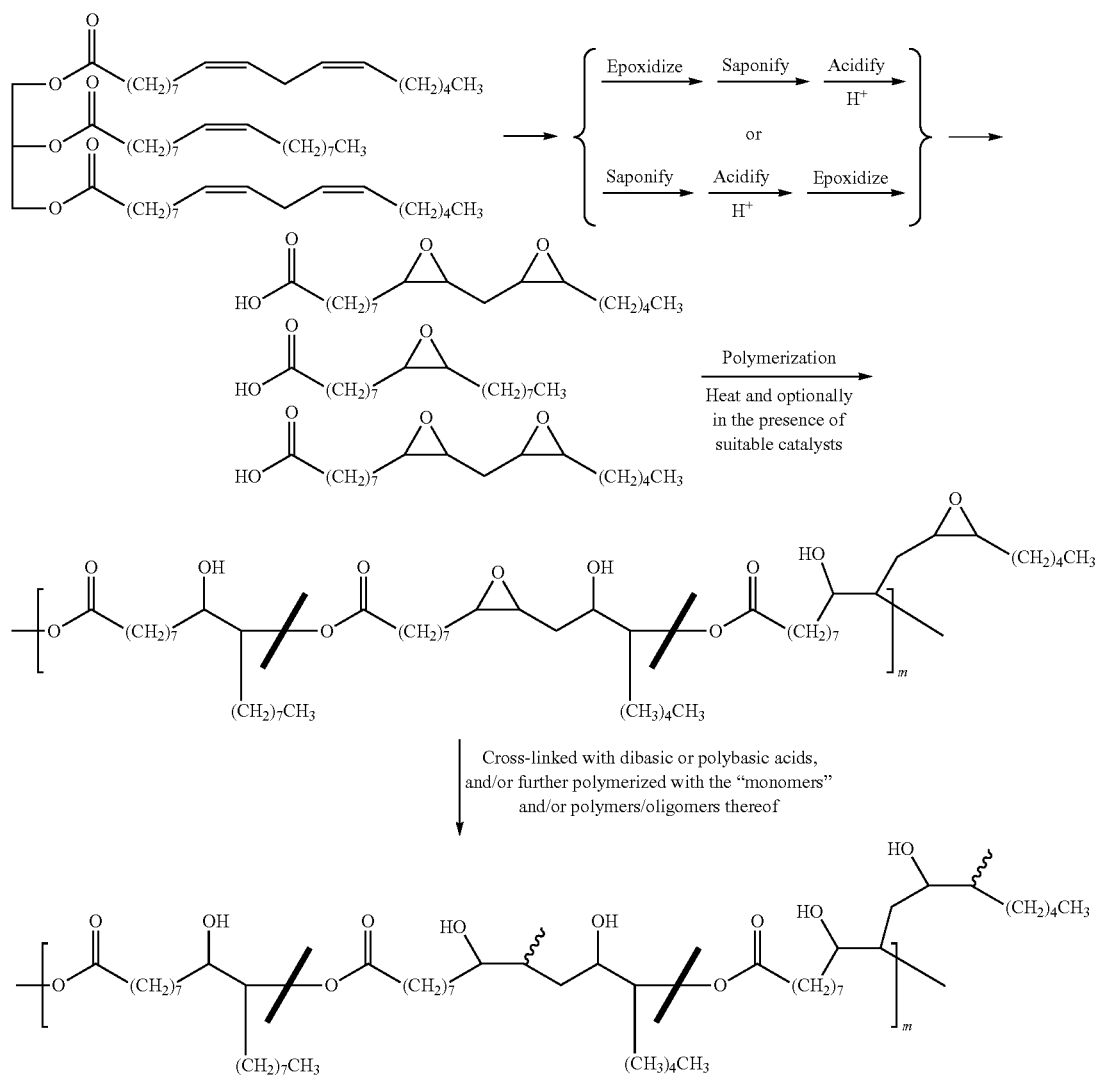

In some embodiments, mixtures of epoxidized fatty acids are obtained (i) via epoxidization of plant oils, marine oil, or other esters of unsaturated fatty acids, followed by saponification of the epoxidized products and acidification of the saponified products thereof, or (ii) via saponification and acidification of plant oils, marine oil, or other esters of unsaturated fatty acids to give a mixture of unsaturated fatty acids followed by epoxidization of the unsaturated fatty acids. The intermediate epoxidized products may be obtained from plant oils, marine oil, or other esters of unsaturated fatty acids by converting their double bonds into more reactive oxirane moieties. In particular embodiments, the intermediate epoxidized products generally refers to any derivative of plant oils, marine oil, or other esters of unsaturated fatty acids whose double bonds are fully or partly epoxidized using any method, e.g. so called in situ performic acid process, which is the most widely applied process in industry. Herein, "plant oil" and "marine oil" refer to a group of triglycerides which are composed of three fatty acids (at least one fatty acid is unsaturated) connected to a glycerol molecule, including but not limited plant oils, marine oils, distilled fractures of plant oils or marine oils, tall oils. Typically, the fatty acids are long chain ($C_{12}$ to $C_{24}$ or even longer) materials with one or multiple double bonds per chain. The plant oil can be palm oil, olive oil, canola oil, corn oil, cottonseed oil, soybean oil, linseed oil, rapeseed oil, castor oil, coconut oil, palm kernel oil, rice bran oil, safflower oil, sesame oil, sunflower oil, or other unsaturated plant oils (both naturally existing and genetically modified), or mixtures thereof. The marine oil can be menhaden, sardine, and herring oil, etc. Other esters of unsaturated fatty acids that can be used in the methods disclosed herein include monoglycerides and/or diglycerides of unsaturated fatty acid; unsaturated fatty acid methyl ester; animal fats like tallow, butterfat, and lard; and artificial fats like Olestra which is an artificial fat created from sucrose and fatty acids.

Saponification of (epoxidized) plant oils, marine oil, or other esters of unsaturated fatty acids can take place in the presence of sodium hydroxide or potassium hydroxide, etc. In the course of the saponification and acidification, the epoxy groups in the intermediate epoxidized products can be preserved completely under controlled reaction conditions. In some embodiments, a mixture of epoxidized fatty acids obtained via saponification of epoxidized plant oils, epoxidized marine oil, or other esters of epoxidized fatty acids are used as starting materials without further purification in the new PSA compositions. For example, the mixture of epoxidized fatty acids may include at least one of epoxidized oleic acid, epoxidized elaidic acid, epoxidized myristoleic acid, epoxidized palmitoleic acid, epoxidized sapienic acid, epoxidized vaccenic acid, epoxidized erucic acid, epoxidized ricinoleic acid, epoxidized linoleic acid (including fully and partially epoxidized linoleic acid), epoxidized linoelaidic acid (including fully and partially epoxidized linoelaidic acid), epoxidized linolenic acid (including fully and partially epoxidized linolenic acid), epoxidized α-linolenic acid (including fully and partially epoxidized α-linolenic acid) epoxidized α-eleostearic acid (including fully and partially epoxidized α-eleostearic acid), epoxidized arachidonic acid (including fully and partially epoxidized arachidonic acid), epoxidized eicosapentaenoic acid (including fully and partially epoxidized eicosapentaenoic acid), or epoxidized docosahexaenoic acid (including fully and partially epoxidized docosahexaenoic acid). The mixture of epoxidized fatty acids derived from plant oils, marine oil, or other esters of unsaturated fatty acids, may also include a small amount (e.g., ~10 wt % based on total mixture mass) of at least one of stearic acid, lauric acid, palmitic acid.

In other embodiments, epoxidized oleic acid, epoxidized linoleic acid (including fully and partially epoxidized linoleic acid) or epoxidized linolenic acid (including fully and partially epoxidized linolenic acid) can be separated from the epoxidized fatty acid mixtures prior to their use as an ingredient for the new PSAs. Alternatively, epoxidized oleic acid, epoxidized linoleic acid (including fully and partially epoxidized linoleic acid) or epoxidized linolenic acid (including fully and partially epoxidized linolenic acid) can be obtained by alkanolysis (e.g., methanolysis) of the plant oils, marine oil, or other esters of unsaturated fatty acids to give alkyl oleate, linoleate or linolenate, etc., followed by epoxidization and saponification of the alkyl esters thereof, and acidification of the saponified products thereof, or by hydrolysis of the plant oils, marine oil, or other esters of unsaturated fatty acids to give oleic, linoleic or linolenic acid, etc., followed by epoxidization of unsaturated fatty acids thereof. Illustrative alkyl esters of the fatty acid include methyl, propyl or ethyl esters.

The epoxy/carboxylic acid group ratio of the reaction mixtures described above (epoxidized fatty acid or the mixture of epoxidized fatty acids admixed with optionally at least one epoxide bearing at least two epoxy groups or one carboxylic acid compound bearing at least two carboxylic acid groups) may be from about 0.5 to about 2, preferably 0.55 to 1.6, more preferably 0.6 to 1.4, so that the polymers thereof have a cross-linking density which is appropriate for PSA applications. To this end, more than one kind of plant oils, marine oil, or other esters of unsaturated fatty acids can be utilized in a single mixture as raw materials to be epoxidized and saponified, or more than one epoxidized/saponified product derived from different plant oils, marine oil, or other esters of unsaturated fatty acids can be used in a single mixture, to obtain a mixture of epoxidized fatty acids with an appropriate epoxy/carboxylic acid group ratio. Furthermore, compounds bearing carboxylic acid and/or epoxy groups can be added to the epoxidized fatty acid or the mixture of epoxidized fatty acids for an appropriate epoxy/carboxylic acid group ratio. In the cases with the epoxy/carboxylic acid group ratio higher than unity, carboxylic acid compounds bearing at least two carboxylic acid groups can be used for this purpose. In the cases with the epoxy/carboxylic acid group ratio lower than unity, epoxides bearing at least two epoxy groups can be used. Generally, by selection of monomer pairs, design of the feed composition, and/or optimization of the reaction conditions, compositions with a cross-linking density appropriate for PSA applications can be obtained.

Carboxylic acid compounds (or carboxylic acids) used in the preparation of the present PSAs may include any compound that contains at least two carboxylic acid functional groups, and derivatives or analogs thereof. More than one carboxylic acid compound can be utilized in a single mixture if desired. Carboxylic acid compounds are preferably dibasic aliphatic (linear, branch or cyclic) carboxylic acids which include without limitation, oxalic acid, malonic acid, succinic acid, maleic acid, fumaric acid, itaconic acid, methylsuccinic acid, glutaric acid, adipic acid, pimelic acid, suberic acid, azelaic acid, sebacic acid, brassylic acid, octadecanedioic acid, and docosanedioic acid. Dibasic acids may also be aromatic acids and derivatives thereof, including without limitation, phthalic acid, isophthalic acid and terephthalic acid. Dibasic acids can also be used in the form of anhydrides. Specific examples include without limitation succinic anhydride, maleic anhydride, itaconic anhydride, methylsuccinic anhydride, and phthalic anhydride. The dibasic acids or anhydride derivatives preferably originate from renewable natural resources. In addition to the high energy-consuming traditional processes for the production of dibasic acids, alternative accesses to various dibasic acids from renewable feedstocks have been well reported (see, e.g., "lipids as renewable resources: current state of chemical and biotechnological conversion and diversification" by J. O. Metzger and U. Bornscheuer (*Appl. Microbiol. Biotechnol.* 2006)). For example, itaconic acid is a naturally occurring compound, and produced industrially by fermentation of carbohydrates. Succinic acid can be also obtained by fermentation of sugar. Dimer acids, or dimerized fatty acids, are dicarboxylic acids that may be prepared by dimerizing unsaturated fatty acids usually on clay catalysts (e.g., montmorillonite clay). Tall oil fatty acids (consisting mainly of oleic and linoleic acids) and other fatty acids from plant oils (e.g., erucic acid, linolenic acid), marine oils or tallow (e.g., high oleic tallow) can be starting materials to prepare dimer acids (see, e.g, "Preparation of Meadowfoam Dimer Acids and Dimer Esters and Their Use as Lubricants" by D. A. Burg and R. Kleiman (JAOCS. 1991), "Fats and oils as oleochemical raw materials" by K. Hill (Pure Appl. Chem. 2000)). The dimer acids thereof are usually unsaturated; they are usually hydrogenated to give saturated forms. It should be noted that, dibasic acids with carboxylic acid groups of different reactivity, such as itaconic acid and methylsuccinic acid can be used in the present PSA compositions to increase the "open time" (see below), i.e., in the pre-polymerization stage, almost only the carboxylic acid group of high reactivity reacts with the epoxy groups by controlling the reaction condition (such as temperature, and the nature and amount of catalyst) so that no obvious cross-linking occurs, the remaining carboxylic acid group of lower reactivity takes part in cros slinking reaction in the curing stage.

Carboxylic acid compounds used in the preparation of the present PSAs can also be polybasic acids which include without limitation, citric acid, trimer acids, polymerized fatty acids, 1,2,3,4-butanetetracarboxylic acid, and ethylenediamine tetraacetic acid, trimellitic acid, trimellitic anhydride. Those obtained or derived from renewable raw materials are preferred, e.g., citric acid, trimer acids and polymerized fatty acids. Trimer acids and polymerized fatty acids are currently prepared by polymerizing unsaturated fatty acids usually on clay catalysts (e.g., montmorillonite clay). Tall oil fatty acids (consisting mainly of oleic and linoleic acids, etc.) and other fatty acids from plant oils (e.g., erucic acid, linolenic acid), marine oils, or tallow (e.g., high oleic tallow) can be starting materials to prepare trimer acids and polymerized fatty acids or mixtures thereof. Citric acid is a tribasic organic acid, existing in a variety of fruits and vegetables, most notably citrus fruits. It is a commodity chemical produced and consumed throughout the world; the global production of citric acid in 2007 was over 1.6 million tones, and the world demand is still in rapid increasing (see, e.g., "citric acid production" by M. Berovic and M. Legisa (*Biotechnol. Annu. Rev.* 2007).

From the viewpoint of chemistry, compounds that include two or more displaceable active hydrogen atoms per molecule but the hydrogen atoms are not part of a carboxylic acid moiety can be also used herein instead of "carboxylic acid compounds". Like carboxylic acid compounds, these compounds can react with epoxy group via the "displaceable active hydrogen atoms" which can be part of hydroxyl groups (—OH), amine groups (—NHR and —NH$_2$), thiol groups (—SH), sulfonamides, etc.

In addition, the "carboxylic acid compounds" also include those derived from the carboxylic acid compounds described above. The derivatives can be oligomers or polymers bearing at least two carboxylic acid groups as end groups and/or pendant groups. For example, an excess of dibasic or polybasic acid reacts with glycidyl-containing compounds or epoxides having at least two epoxy or oxirane groups, diols or polyol, or diamines, etc. to give theromoplastic polymers or oligomers bearing at least two carboxylic acid groups as end groups and/or pendant groups.

Epoxides used in the preparation of the present PSAs may include any compound that contains at least two epoxy or oxirane functional groups, and derivatives or analogs thereof. More than one epoxide can be utilized in a single mixture if desired. Diepoxides can be diglycidyl compounds or epoxides having two epoxy groups, including without limitation, bisphenol A diglycidyl ether, bisphenol A ethoxylate diglycidyl ether, bisphenol A propoxylate diglycidyl ether, bisphenol F diglycidyl ether, bisphenol F ethoxylate diglycidyl ether, bisphenol F propoxylate diglycidyl ether, ethylene glycol diglycidyl ether, diethylene glycol diglycidyl ether, poly(ethylene glycol) diglycidyl ether, propylene glycol diglycidyl ether, dipropylene glycol diglycidyl ether, poly(propylene glycol) diglycidyl ether, 1,3-butanediol diglycidyl ether, 1,4-butanediol diglycidyl ether, neopentyl glycol diglycidyl ether, glycerol diglycidyl ether, diglycidyl 1,2,3,6-tetrahydrophthalate, 1,2-cyclohexanedicarboxylate diglycidyl ether, dimer acid diglycidyl ester, 1,4-cyclohexanedimethanol diglycidyl ether, resorcinol diglycidyl ether, poly(dimethylsiloxane) terminated with diglycidyl ether, epoxidized linoleic acid ester, epoxidized plant oils with two epoxy functional groups epoxidized marine oils with two epoxy functional groups, or epoxidized animal fats with two epoxy functional groups. Tribasic or higher epoxyfunctionality compounds include without limitation, trimethylolpropane triglycidyl ether, trimethylolethane triglycidyl ether, N,N-diglycidyl-4-glycidyloxyaniline, 4,4'-methylene bis(N,N-diglycidylaniline), tris(4-hydroxyphenyl)methane triglycidyl ether, tris(2,3-epoxypropyl) cyanurate, tris(2,3-epoxypropyl) isocyanurate, poly(ethylene-co-glycidyl methacrylate), epoxy functionalized polybutadiene, epoxidized plant oils having no less than three epoxy functional groups, epoxidized marine oils with no less than three epoxy functional groups, epoxidized animal fats with no less than three epoxy functional groups, epoxidized fatty acid esters having no less than three epoxy functional groups like epoxidized linolenic acid ester, etc.

In addition to the reactants described above, the reaction mixtures can also contain from about 0.05 to 10, more particularly 0.1 to 5, preferably from about 0.1 to 2 parts by weight of a catalyst, based on the weight of the reactants, especially when the reaction is performed at low temperatures (e.g., <120° C.). The catalysts accelerate the pre-polymerizations and reduce the cure time of the pre-polymerized mixtures. Catalysts used to effectively catalyze the reaction between carboxylic acid groups or anhydride groups and epoxy groups can be employed for this purpose:

(1) amines, especially tertiary amines, —examples include but are not limited to, triethylamine, trimethylamine, tri-n-pentylamine, trioctylamine, tridecylamine, tridodecylamine, trieicosylamine, docosyldioctylamine, triacontyldibutylamine, 2-ethylhexyl di-n-propylamine, isopropyl di-n-dodecylamine, isobutyl di-n-eicosylamine, 2-methyldocosyl di-(2-ethylhexyl) amine, triacontyl di-(2-butyldecyl) amine, n-octadecyl di-(n-butyl)amine, n-eicosyl di-(n-decyl)amine, n-triacontyl n-dodecylmethylamine, n-octyldimethylamine, n-decyldiethylamine n-dodecyldiethylamine, n-octadecyldimethylamine, n-eicosyl dimethylamine, n-octyl n-dodecylmethylamine, n-decyl n-eicosylethylamine, n-octyldimethylamine, n-decyldimethylamine, n-dodecyldimethylamine, n-tetradecyldimethylamine, n-hexadecyldimethylamine, n-octadecyldimethylamine, n-eicosyldimethylamine, di-(n-octyl)methylamine, di-(n-decyl)methylamine, di-(n-dodecyl)methylamine, di-(n-tetradecyl)methylamine, di-(n-hexadecyl)methylamine, di-(n-octadecyl)methylamine, di-(n-eicosyl)methylamine, n-octyl n-dodecylmethylamine, n-decyl n-octadecylmethylamine, dimethylbenzylamine, N,N-dimethylaniline, N,N-dimethylaniline, N-methyldiphenylamine, triphenylamine, N-methyl-N-dodecylaniline pyridine, 2-methylpyridine, triethanolamine, N-methylmorpholine, N-methylpiperidine, N-ethylpiperidine, N,N-dimethylpiperazine, 1-methyl imidazole, 1-butylimidazole, 1,8-diazabicyclo[5.4.0]undec-7-ene, 1,5-diazabicyclo[5.4.0]undec-5-ene, 1,5-diazabicyclo[4.3.0]non-5-ene, 1,4-diazobicyclo[2.2.2]-octane, tetramethyl guanidine, N,N,N',N'-tetramethyl-1,8-diaminonaphthalene, 2-phenyl-2-imidazoline, 2-ethylimidazole, bis(2-ethylhexyl)amine, etc;

(2) metal salts or complexes, —examples include but are not limited to, chromium (III) tris(acetylacetonate), chromium (III) 2-ethylhexanoate, AFC Accelerator AMC-2 (a 50 wt % solution of chromium (III) complex available from Ampac Fine Chemical LLC), chromium (III) hexanoate, chromium (III) octoate, chromium (III) stearate, chromium (III) naphthenate, 3,5-diisopropylsalicylato chromium (III) chelate, bis(3,5-diisopropylsalicylato)-monohydroxy chromium (III) chelate, zinc acetate, zinc acetate dihydrate, zinc acetylacetonate, zinc octoate, zinc laurate, zinc salicylate, zinc glycinate, zinc gluconate, zinc oleoylsarcosinoate, zinc naphthenate, zinc 2-ethylhexyl acid phosphate salt, zinc butyl acid phosphate salt, zinc di-2-ethylhexyldithio-phosphate, zinc salt of dodecenyl succinate butyl half ester, N-butylsalicylaldimio zinc (II) chelate, zinc isovalerate, zinc succinate, zinc dibutyl dithiocarbamate, stannous octoate, stannum (II) 2-ethylhexyl acid phosphate salt, titanium ethyl acetoacetate chelate, titanium acetoacetate chelate, titanium triethanolamine chelate, zirconium octoate, zirconium 6-methylhexanedione, zirconium (IV) trifluoroacetylacetone, 3,5-diisopropylsalicylato nickel (II) chelate, nickel acetylacetonate, N-butylsalicylaldimio nickel (II) chelate, 3,5-diisopropylsalicylato manganese (II) chelate, manganese naphthenate, manganese naphthenate, magnesium 2,4-pentadionate, iron octoate, ferric linoleate, iron (III) acetylacetonate, cobalt octoate, cobalt naphthenate, cobalt (III) acetylacetonate, N-butylsalicylaldimio cobalt (II) chelate, N-butylsalicylaldimio cobalt (III) chelate, 3,5-diisopropylsalicylato cobalt (II) chelate, N-butylsalicylaldimio copper (II) chelate, 3,5-diisopropylsalicylato copper (II) chelate, 3,5-diisopropylsalicylato oxyvanadium (IV) chelate, aluminum acetylacetonate, aluminum lactate, dibutyltin dilaurate, dibutyltin oxide, butylchloro tin dihydroxide, cerium naphthenate, calcium octoate, bismuth octoate, lithium acetate, sodium acetate, potassium acetate, etc;

(3) quaternary ammonium compounds, —examples include but are not limited to, tetrabutyl ammonium bromide, tetrabutyl ammonium iodide, tetrabutyl ammonium hydrogen sulphate, tetrabutyl ammonium fluoride, tetrabutyl ammonium chloride, tetraethyl ammonium bromide, tetraethylammonium iodide, tetrapropylammonium bromide, tetrapropyl ammonium iodide, tetramethyl ammonium chloride, tetramethylammonium bromide, tetramethyl ammonium iodide, tetraoctyl ammonium bromide, benzyltriethyl ammonium chloride, benzyltributyl ammonium chloride, benzyltrimethyl ammonium chloride, benzyltrimethylammonium bromide, butyltriethyl ammonium bromide, methyltrioctyl ammonium chloride, methyltricapryl ammonium chloride, methyltributyl ammonium chloride, methyltributyl ammonium bromide, methyltriethyl ammonium chloride, myristyltrimethyl ammonium bromide, tetradecyltrimethyl ammonium bromide, cetyltrimethyl (or hexadecyltrimethyl) ammonium bromide, hexadecyltrimethyl ammonium bromide, cetyltrimethylammonium chloride, hexadecyltrimethyl ammonium chloride, lauryltrimethyl ammonium chloride, dodecyltrimethyl ammonium chloride, phenyltrimethyl ammonium chloride, benzalkonium chloride, cetyldimethylbenzyl ammonium bromide, cetalkonium bromide, cetyldimethylbenzyl ammonium chloride, cetalkonium chloride, tetrabutyl ammonium perchlorate, tetrabutyl ammonium p-toluene sulfonate, tetraethyl ammonium p-toluene sulfonate, cetyltrimethyl ammonium p-toluene sulfonate, tetraethyl ammonium tosylate, tetrabutyl ammonium tosylate, cetyltrimethyl ammonium tosylate, phenyltrimethyl ammonium bromide, benzyltrimethyl ammonium hydroxide, tetrabutyl ammonium hydroxide, tetramethyl ammonium hydroxide, etc;

(4) quaternary phosphonium compounds, —examples include but are not limited to, tetrabutyl phosphonium bromide, ethyltriphenyl phosphonium iodide, ethyltriphenyl phosphonium bromide, ethyltriphenyl phosphonium iodide, butyltriphenyl phosphonium bromide, benzyltriphenyl phosphonium chloride, methyltriphenyl phosphonium bromide, methyltriphenyl phosphonium iodide, tetraphenyl phosphonium bromide, triphenyl phosphonium bromide, methyltriphenyl phosphonium chloride, butyl triphenyl phosphonium chloride, (methoxy methyl)triphenyl phosphonium chloride, etc;

(5) phosphines, examples include but are not limited to, triphenylphosphine, etc;

(6) alkali metal hydroxide, e.g. potassium hydroxide, sodium hydroxide, etc.

The catalysts may be added at any point during the polymerization from the initial charge to the coating of the reaction mixtures.

In certain embodiments, the hydroxyl-functional polyesters disclosed herein are the major component of the PSA composition meaning that the PSA composition includes at least about 50, particularly at least about 70, more particularly at least about 80, and most particularly at least about 90 weight percent (based on the total weight of the PSA composition), of at least one cross-linked hydroxy-functional polyester obtained by reacting mixtures of (i) an epoxidized fatty acid or a mixture of epoxidized fatty acids, and optionally (ii) at least one epoxide compound having at least two epoxy groups or one carboxylic acid compound having at least two carboxylic acid groups. The PSA compositions may also include additives and fillers. Fillers may either originally occur in the starting materials such as esters of fatty acids, or be added as needed. Additives such as tackifiers, colored pigments, opacifiers, processing oils, plasticizers, solvents and other constituents known to the tape art may be incorporated in the PSAs.

Polymerization of epoxidized fatty acid or the mixture of epoxidized fatty acids and optionally carboxylic acid or epoxides may be accomplished by heating the reaction mixture under controlled conditions (especially in terms of the nature and amount of catalyst, and the reaction temperature and time). The reaction mixtures can be admixed together through at least two methods: (1) epoxidized fatty acid or the mixture of epoxidized fatty acids (component a), carboxylic acids or epoxidized compounds (component b), and optionally catalysts are mixed together at room temperature prior to heating; (2) component b is mixed with catalysts at room temperature or elevated temperatures to give a homogeneous solution, followed by the addition of component a which may be previously melt to liquid state by heating; (3) component a is mixed with catalysts and heated to give a polymer or oligomer, followed by the addition of component b.

In particular embodiments, the reaction mixture of (i) epoxidized fatty acid or a mixture of at least two different epoxidized fatty acids and optionally (ii) carboxylic acids or epoxides, is pre-polymerized to a degree that cross-linking does not obviously occur and the viscosity of the intermediate reaction mixture is appropriate to allow coating, followed by curing the intermediate reaction mixture at elevated temperatures to produce PSAs and making PSA products. By careful selection of monomer pairs, design of the epoxy/carboxylic acid group ratio, and optimization of the reaction conditions and operations, a rich array of polymer structure and physical properties can be obtained from the novel compositions based on epoxidized fatty acids, thus making it possible to fine-tune the structure and related properties of them to meet the criteria for PSAs and for various demands of final PSA products.

Pre-polymerization of (i) the epoxidized fatty acid or the mixture of epoxidized fatty acids and optionally (ii) carboxylic acid or epoxide compounds can be carried out at a temperature suitably in the range from 20 to 300° C. for 1 to 180 minutes, preferably from 50 to 220° C. for 2 to 120 minutes, and more particularly from 60 to 180° C. for 5 to 60 minutes, to a degree that cross-linking does not obviously occur, and the viscosity of the intermediate reaction mixture is appropriate for blade-coating. For example, the viscosity should be no higher than 2,000,000 mPa·s, preferably no higher than 200,000 mPa·s, more particularly no higher than 100,000 mPa·s, at operating temperatures and stirring speeds. If desired, the reaction is preferably carried out under an inert atmosphere free from oxygen, e.g., under nitrogen, since the mixtures are easily oxidized at high temperature to give dark-colored products. The compositions may have an open time of up to about 5 or 240 minutes, depending on the nature of epoxidized fatty acid or the mixture of epoxidized fatty acids, and the nature and amount of the carboxylic acid or epoxide compounds, the ratio of epoxy to carboxylic acid group, the viscosity of the reaction mixture, reaction temperature, and the nature and amount of catalysts used, etc. As used herein, "open time" denotes the time from mixing of reactants to the time at which cross-linking takes place and viscosity greatly increase to a point that the mixed composition can no longer be applied. Generally, the higher the reaction temperature, the shorter the open time. At lower temperature, the carboxylic acid or anhydride groups are mainly consumed by epoxy groups. At higher temperature, however, both epoxy groups and hydroxyl groups derived from epoxy-carboxylic acid reaction may react with carboxylic acid or anhydride groups. As the reaction proceeds further, the carboxylic acid-hydroxyl esterification reaction may dominate the reaction, with the result that the density of cross-linking increases and the mixed composition becomes more difficult to be coated and less appropriate for PSA applications.

After the above pre-polymerization reaches a desirable extent that the reaction mixture turns homogeneous, cross-linking does not obviously occur (i.e., within the open time of the reaction mixture), and the viscosity of the reaction mixture is appropriate to allow blade-coating, the resulting pre-polymer mixture is coated onto release liners (e.g., siliconized release liners) or PSA backing materials, with the result that a thin, uniform layer of the mixtures is coated on the backing materials or liners at a coating level of about 2 to about 10 mg/cm$^2$. The PSA backing materials can be paper, cellophane, plastic film (e.g., bi-axially oriented polypropylene (BOPP) film, or polyvinylchloride (PVC) film), cloth, tape and metal foils, etc. It should be noted that, the reaction mixtures can be blade-coated on siliconized release liners or PSA backing substrates with a glass bar immediately after mixing well the reaction mixtures, although in some particular embodiments, in order to increase the viscosity of the reaction mixtures for good coatability, the pre-polymerizations are allowed to take place prior to coating to a desirable degree such that an appropriate viscosity of the mixture is reached but cross-linking does not obviously occur. In other particular embodiments, some of the reactants per se are waxy or a powdery solid of a fairly high melting point; they are preferably dissolved under heating and stirring into the reaction mixture prior to coating and curing.

The resulting compositions coated on the liners or backing materials are then heated such as in an air-circulating oven, infrared oven, or tunnel oven so that appropriate cross-linking of the pre-polymerized mixtures can take place to give a "dry" adhesive layer of sufficient cohesion strength, good initial tack and adhesive power that are appropriate for PSA applications. According to some particular embodiments, the pre-polymers that are coated on the PSA backings are subjected to heat such as in an air-circulating oven maintained at 100-300° C. for 10 seconds to 100 minutes, preferably at 120-250° C. for 20 seconds to 80 minutes, and more particularly at 150-200° C. for 30 seconds to 60 minutes. Generally, the higher the reaction temperature, the shorter the duration of heating is needed to accomplish the curing reaction. However, it should be noted that the heat stability of the PSA backing or siliconized release liners should be considered before choosing the oven temperature. On the other hand, at higher temperatures, both epoxy groups and hydroxyl groups derived from carboxylic acid-epoxy reaction may react with carboxylic acid or anhydride groups. As the curing reaction proceeds further, the carboxylic acid-hydroxyl esterification reaction may dominate the reaction, with the result that the density of cross-linking increases and the resulting composition becomes less appropriate for PSA applications. Although cross-linking is desirable for PSA applications, particularly where it is desired to increase the cohesive strength of the adhesive without unduly affecting its compliance, too high density of cross-linking can be deleterious to the PSA properties, with a severe loss of compliance as reflected in the peel test. Therefore, the reaction temperature at this stage should be finely tuned for appropriate cross-linking of the PSA compositions.

The PSA composition coatings on the release liners described above can also be covered with a sheet of backing material, resulting in a sandwich assembly which is then pressed (e.g., with a rubber roller) to achieve sufficient wet-out of the adhesive onto the PSA backing. Subsequently, the release liner is removed from the sandwich assembly, with the adhesive transferring onto the PSA backing. The resulting adhesive coatings on the backing are then heated such as in an air-circulating oven so that appropriate cross-linking of the polyesters can take place to give a dry adhesive layer of sufficient cohesion strength, good initial tack and adhesive power that are appropriate for PSA. It should be noted that, the coating composition layer on the backing substrate after heating might not have a good appearance, with blotches of no or little adhesive on the backing substrate, probably due to shrinkage of the adhesive composition during the polymerization and curing reaction. To address this issue, a novel technology, viz. "thin-layer reactor" technology is developed and applied to the invented PSA systems. i.e., the epoxidized fatty acid-based adhesive composition is initially blade-coated on the siliconized face of siliconized release liners; the resulting adhesive coatings on the siliconized release liners are then covered with a sheet of PSA backing material or another sheet of release liner, resulting in the sandwich assembly functioning as "thin-layer reactor".

In some particular embodiments, the sandwich assembly consisting of a release liner and the backing material as a whole may be heated to cure the PSA composition and then the release liner may be removed. In other particular embodiments, the preparation of a PSA composition and PSA products comprising the composition could be performed with the aid of two siliconized release liners with different adhesion-repellence ability to the final adhesive composition. The pre-polymerization mixture is initially blade-coated on the siliconized face of a sheet of partially siliconized release liner; the resulting adhesive coating is then covered with a sheet of fully siliconized release liner (with the siliconized face inwardly), resulting in a sandwich assembly which is pressed (e.g., with a rubber roller) to achieve a good contact between the adhesive composition and the two liners. A "partially" siliconized release liner means that the release liner surface is partially covered by a silicone agent; a "fully" siliconized release liner means that the release liner surface is substantially covered by a silicone agent, leading to better adhesion-repellence ability to the adhesive composition than "partially" siliconized release liner. The sandwich assembly is then heated such as in an air-circulating oven so that appropriate cross-linking of the polymers can take place to give a dry adhesive layer of sufficient cohesion strength, good initial tack and adhesive power that are appropriate for PSA application. Afterwards, the fully siliconized release liner is quickly peeled off without taking away any adhesive composition, after which a sheet of backing material such as paper, BOPP film, or PVC film is immediately and carefully covered on the adhesive layer. The new "sandwich" is then pressed (e.g., with a rubber roller) to achieve sufficient wet-out of the adhesive onto the backing material in order to provide adequate adhesion. After the sandwich assembly is cooled down, the partially siliconized release liner could be easily peeled off with the adhesive composition completely transferring to the backing material. In these embodiments, a first release liner, e.g., the partially siliconized release liner has an adhesion-repellence to the final adhesive composition less than that of a second release liner, e.g., the fully siliconized release liner. In other words, the second release liner can be more easily removed than the first release liner meaning that one release liner can be removed while the PSA composition still adheres to another release liner. The siliconized released liner can be optionally left for protection of the adhesive layers on the backing material. Advantages for this technology include without limitation, (1) shrinkage of the PSA composition can be considerably avoided, (2) low molecular weight starting materials for making the PSA composition are avoided to penetrate the paper backing to give oily or dirty appearance of the resulting PSA tape, and (3) in the cases that materials of low Heat Distortion Temperature and/or inferior thermal stability (such as PP and PVC) are used as PSA backing materials, subjection to oven heating at high temperatures (e.g., 160° C.) can be avoided.

According to particular embodiments, the invented PSAs may be used to manufacture many different types of PSA tapes. Thus, various flexible tape backings and liners may be used, including films (transparent and non-transparent), plastics such as PET, BOPP and PVC film, modified natural substances such as cellophane, cloths, papers, non-woven fibrous constructions, metal foils, metalized plastics foils, aligned filaments, etc. The adhesive layers can be covered with papers or films which contain an adhesive-repellent layer, e.g. a separating layer consisting of silicone, for the protection of the adhesive layers on the PSA backings. The back side of the PSA films, tapes or foils can be coated with an adhesive-repellent coating (e.g., silicone coating) for facilitating rolling off the PSA.

In particular embodiments, the preparation of the PSA compositions and PSA products thereof as disclosed herein could be continuously performed using a combination of reactive extrusion and reactive calendaring, which is illustrated in FIG. 1. The reactive calendaring setup is a device that includes a series of rollers placed in an oven chamber. In some embodiments, the rollers may be unheated and disposed of inside an oven chamber at a preset temperature. In other embodiments, heated rollers can be used and the whole calendaring setup does not need to be housed in an oven chamber. As shown in FIG. 1, the pre-polymerizations or curing reactions are done continuously using reactive extrusion in a mono- or twin-screw extruder. The final PSA compositions from the extruder are thereupon coated on backing materials (e.g., film or paper) or release liners, which are then laminated with other release liners with different adhesion ability to the adhesive compositions, to give a sandwich assembly. Afterwards, the sandwich assembly is directed to heated calendar rollers or calendar rolls placed in an oven chamber at a preset temperature. The duration of the process can be fine-tuned by adjusting the number and sizes of the rolls or the travel distance of the assembly inside the oven chamber, so that appropriate cross-linking of the polyesters can take place to give a dry adhesive layer of sufficient cohesion strength, good initial tack and adhesive power that are appropriate for PSA.

The novel PSA compositions based on epoxidized fatty acids and the method of making them and the PSA products thereof are attractive from both the commercial and environmental perspectives. The advantages of these novel PSAs include without limitation, (1) the starting materials can entirely originate from naturally abundant and renewable resources, providing an alternative to petrochemical-based PSAs, (2) the products are fully biodegradable, thus alleviating environmental pollution by used PSA-containing products, and (3) the novel PSA compositions and PSA products thereof are made without using any organic solvent, or additives such as tackifiers and waxes that are commonly used in many commodity petrochemical-based PSAs, therefore, the whole process is environmentally friendly, and the products thereof are non-toxic, green, and safer to use.

Example 1

This example describes the preparation of a mixture of epoxidized fatty acids (EFAs, containing a small amount of saturated fatty acids, e.g., 14 wt % based on the total mixture) by saponification of epoxidized soybean oil (ESO, epoxy equivalent weight (EEW)~229) and acidification of the saponified products. Sodium hydroxide (5.5 g), water (25 mL) and 75 mL ethanol were charged to a 250-mL, round-bottom flask equipped with a water bath and magnetic stirrer. The mixture was stirred for 5 minutes at r.t. to give a clear solution, followed by addition of ESO (36.0 g). The resulting mixture was heated up to 50° C. by the water bath with stirring (800 rpm). When the temperature of the mixture reached 50° C., heating and stirring were continued for 15 minutes at the same temperature to give an almost homogeneous (slightly cloudy), yellow mixture. The mixture was then subjected to rotary evaporation to give an off-white, waxy cake. The cake was then admixed with about 10 ml of water. The resulting mixture was heated to about 65° C., and adjusted to pH=1 by addition of 3.5 N HCl solution with stirring. The mixture was then allowed to separate completely while keeping hot (temperature~65° C.), and the upper layer was separated and washed repeatedly (five times) with hot water (temperature~65° C.) until pH of the mixture reached 6.5-7.0. Afterwards, the upper layer was collected and dried in vacuo to a constant weight. The isolated yield was 31.6 g (ca 93% of theoretical yield). $^1$H NMR and FTIR analyses indicated that ESO was almost completely hydrolyzed to a mixture of free fatty acids, with the epoxy groups preserved completely. The final product has an acid number of about 290, and an epoxy equivalent weight of about 226.

Alternatively, the reaction mixture after saponification can be cooled in an ice-water bath to about 10° C., and 100 mL of ethyl acetate was added to the mixture. Stirring was started and pH of the mixture was adjusted to 4 by addition of 3N HCl solution. Afterwards, the mixture was separated in a separation funnel. The upper ethyl acetate layer was collected, and the lower aqueous layer was extracted with 80 mL of ethyl acetate. The collected ethyl acetate layers were then combined, and washed once with deionized water (200 ml) and twice with brine (2×200 ml), then dried over $Na_2SO_4$. Finally, the mixture was filtered through Buchner fritted funnel to give a clear pale-yellow filtration which was subject to rotary evaporation (water bath at 40° C.) and high vacuum to remove ethyl acetate (and the remaining ethanol and residue water). The product was clear, greenish-yellow oil which easily solidified to wax when cooling down to r.t. The isolated yield was 33 g (ca 97% of theoretical yield).

According to $^1$H NMR and FTIR analyses, the product was almost the same as those prepared according to the above procedure.

Example 2

This example describes the preparation of epoxidized oleic acid (EOA) by epoxidization and hydrolysis of methyl oleate (MO; Aldrich, 99%).

(1) Epoxidation of MO. In a 100-mL, round-bottom flask equipped with a water bath and overhead mechanical stirrer, 10 g of MO (0.034 mol), 5 g of formic acid (0.11 mol), and 6.8 g of hydrogen peroxide solution (35 wt %, 0.07 mmol of $H_2O_2$) were stirred vigorously for approximately 16 h. A water bath was used to maintain a constant temperature of 23° C. Following the reaction, an ether extraction was performed to eliminate any unreacted components. The mixture was dissolved in 100 mL of diethyl ether, placed in a separation funnel, and washed with a series of solutions. First, the product was washed with approximately 100 mL of distilled water. The product was then washed with approximately 100 mL of a saturated sodium bicarbonate solution (aqueous). Both of these steps helped neutralize the solution by eliminating any remaining free acid. This step was continued until pH paper indicated it was neutral. Next, the system was washed with approximately 100 mL of brine to eliminate any water mixed in the organic phase. The mixture was dried over anhydrous sodium sulfate to eliminate any residual water. Finally, the sodium sulfate was filtered out, and the excess ether was evaporated off, leaving the epoxidized methyl oleate (EMO, isolated yield~99% of theoretical one). $^1$H NMR analysis indicated that the double bond in MO almost completely disappeared, and the molar ratio of epoxy to carboxylic acid group was 0.92 (in the epoxidation process, some by-reaction may occur leading to the loss of the oxirane groups).

(2) Hydrolysis of EMO. EMO (10 g, 0.032 mol) was dissolved in mixture of acetone (200 mL) and 0.4N NaOH (200 mL) and stirred at r.t. for 2 h. After completion of the reaction, the mixture was concentrated. The aqueous solution was washed with ethyl acetate (2×250 mL) and cooled in an ice bath, and pH was adjusted to 4. The resultant product was extracted with ethyl acetate (3×300 mL). The combined organic layer was dried over anhydrous $Na_2SO_4$ and evaporated to dryness. The product was white and waxy at r.t. $^1$H NMR analysis indicated that EMO was fully hydrolyzed to epoxidized oleic acid with the epoxy groups preserved completely (molar ratio of epoxy to carboxylic acid group is 0.92). Further crystallization of the crude product could give purer one with a molar ratio of epoxy to carboxylic acid group more than 0.95.

Example 3

This example describes the preparation of PSA composition from EFAs (prepared according to the procedure of Example 1 EEW~226; acid number~290) in the presence of AFC Accelerator AMC-2 (AMC-2), and of PSA tapes comprising the composition with the aid of two siliconized release liners with different adhesion-repellence property for the final adhesive composition.

AMC-2 (0.385 g) and EFAs (11.6 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 80° C., heating and stirring (400 rpm) were continued for 33 minutes at the same temperature to give a homogeneous, light green, viscous resin. The resin was then quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 4 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a good adhesive power of about 2.0 lbf/inch on stainless steel (type 302). The 90° peel adhesion test procedure and conditions are described below; the sample was cleanly removed in the test, leaving no adhesive residue on the panel. The experimental conditions and 90° peel adhesion test results are shown in Table 1.

This following procedure describes 90° peel adhesion test on stainless steel for all of the sample tapes. The measure of bond strength between an adhesive and a substrate is defined as adhesion, which is typically obtained using the 90° peel adhesion test method by measuring the force required to remove the pressure-sensitive material from a stainless steel, at an angle of 90°, and at a specified speed of 12 inches/minute, according to ASTM D3330/D3330M-04 (2010). The tests are performed on an Instron 5582 testing machine at 23±1° C. and 50±5% RH. An exemplary 90° peel adhesion test of sample tapes on a stainless steel test panel (type 302 stainless steel, 2 by 5 inches) consists of following steps:

(1) Clean the test panel three times with acetone and Kimwipe-Clark wipers, and condition the panel for about 10-12 minutes before applying the tape onto the panel.
(2) Randomly cut 5 strips of specimens from each PSA-coated sample sheet. The size of the specimens is 1 by 12 inches.
(3) Fold approximately 0.5 inch at one end of the specimen, adhesive to adhesive to form a tab. Touch other end of the specimen to an end of the test panel, with the adhesive side down against the stainless steel test panel. Hold the folded end of the specimen so that it does not make contact with the panel but is positioned loosely above it. Press the specimen by two passes of a 4.5-pound hard rubber roller in the direction parallel to the panel length, to achieve sufficient wet-out onto the panel surface in order to provide adequate adhesion.
(4) The pasted specimen tape was allowed to dwell for 1 minute prior to testing.
(5) Set up and calibrate the testing machine in accordance with the manufacture instructions. A five-pound load cell was used.
(6) Double back the folded end of the specimen tape at a 90° angle and peel 1 inch of it from the panel. Place the folded end of the specimen onto the upper jaw of the testing machine, and start testing. The speed of the moving jaw for the peel test was 12 inches/minute. While the upper jaw was moving up, the panel was passively moved in the horizontal direction along the holder so that the specimen tape maintained a peel angle of 90° throughout the test.

(7) Data were collected after the first inch of specimen tape was peeled, and average peel adhesion strength in pounds was obtained for peeling the rest of the tape.

(8) Repeat the above steps to test the other four strips of specimen, and average the results.

chromium (III) tris(acetylacetonate) (Cr-TAA), and of PSA tapes comprising the composition with the aid of two siliconized release liners with different adhesion-repellence property for the final adhesive composition.

Cr-TAA (0.109 g) and EFAs (10.8 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 80° C., heating and stirring (400 rpm) were continued for 52 minutes at the TABLE 1[a]

| | | Pre-polymerization | | | | Cure at 160° C. | |
|---|---|---|---|---|---|---|---|
| Example Nos.[b] | Epoxidized fatty acids | diacids or TTE, amount in wt %[c] | catalysts (phr) | temperature (° C.) | time (min) | time (min) | peel strength[d] (lbf/inch) |
| 3 | EFAs | — | AMC-2, 3.3 | 80 | 33 | 4 | 2.0 |
| 4 | EFAs | — | Cr-TAA, 1.0 | 80 | 52 | 20 | 2.0 |
| 5 | EFAs | — | Cr-TAA, 2.1 | 130 | 30 | 23 | 0.9 |
| 6 | EFAs | — | Cr-TAA, 2.1 | 130 | 90 | 22 | 1.2 |
| 7 | EFAs | DA, 28.7 | AMC-2, 3.2 | 80 | 40 | 6 | 2.5 |
| 8 | EFAs | DA, 29.5 | AMC-2, 3.3 | 100 | 25 | 10 | 2.2 |
| 9 | EFAs | DA, 29.5 | AMC-2, 3.3 | 100 | 25 | 10 | 2.1 |
| 10 | EFAs | DA, 9.6 | AMC-2, 1.9 | 80 | 71[e] | 3 | 1.4 |
| 11 | EFAs | DA, 9.6 | AMC-2, 1.9 | 80 | 71[e] | 5 | 0.8[f] |
| 12 | EFAs | DA, 9.6 | AMC-2, 1.9 | 80 | 71[e] | 5 | 0.8 |
| 13 | EFAs | AA, 9.3 | AMC-2, 3.9 | 100 | 15 | 2.5 | 2.4 |
| 14 | EFAs | IA, 8.3 | AMC-2, 2.8 | 100 | 16 | 5 | 1.2 |
| 15 | EFAs | SAn, 8.7 | AMC-2, 3.9 | 120 | 5 | 3.5 | 0.8 |
| 16 | EFAs | SA, 9.4 | AMC-2, 3.9 | 100 | 27 | 7 | 1.4 |
| 17 | EFAs | SA, 9.4 | AMC-2, 3.9 | 100 | 27 | 5 | 2.0 |
| 18 | EFAs | PA, 9.0 | AMC-2, 2.1 | 120 | 10 | 10 | 0.3 |
| 19 | EFAs | PA, 9.0 | AMC-2, 2.1 | 120 | 10 | 10 | 0.4 |
| 20 | EOA | TTE, 7.7 | Cr-TAA, 1.8 | 135 | 70[g] | 20[h] | 2.4 |

[a] abbreviations: TTE, trimethylolpropane triglycidyl ether (epoxy equivalent weight, or EEW, 138); EFAs, mixture of epoxidized fatty acids (EEW, 226; acid number, 290); AMC-2, AFC Accelerator AMC-2 (a 50 wt % solution of chromium (III) complex available from Ampac Fine Chemical LLC); Cr-TAA, chromium (III) tris(acetylacetonate) (Aldrich, 97%); DA, dimer acid (hydrogenated; available from Aldrich; average $M_n$~570, dimer acid ≥ 98%, monomer ≤ 1%, trimer acid ≤ 1%); AA, adipic acid (Aldrich, 99%); IA, itaconic acid (Aldrich, 99%); SAn, succinic anhydride (Aldrich, 99%); SA, sebacic acid (Aldrich, 98%); PA, phthalic anhydride (Aldrich, 99+%); EOA, epoxidized oleic acid (EEW, 324; acid number, 298).
[b] PSA backing materials are paper, except that bi-axially oriented polypropylene (BOPP) film is used as backing material in Examples 5, 8, 11, 16 and 18, and that polyvinylchloride (PVC) film is used as backing material in Examples 6, 9, 12, 17 and 19.
[c] dibasic acids or anhydrides thereof, or TTE which is used as a curing agent in the system of EOA, and their amount in weight percent based the total reactant mass.
[d] the 90° peel adhesion test method, procedure, and conditions are described in Example 3; the sample adhesives were cleanly removed in the test, leaving no adhesive residue on the panel.
[e] the polymerization took place for 58 minutes and then for another 13 minutes after DA was added.
[f] the shear time to failure tests were also performed at 23° C. on a stainless steel (type 302) substrate in accordance with ASTM D3654/D3654M-06 (2006), using a 1000 gram test mass and 1 inch times 1 inch testing area. And a shear time to failure of 20 hours was recorded.
[g] the polymerization took place for 65 minutes and then for another 5 minutes after TTE was added.
[h] the glass transition temperature of the final PSA composition was determined to be about −20° C. by differential scanning calorimetry using a heating rate of 10° C./minute from −80 to 100° C.

Example 4

This example describes the preparation of PSA composition from EFAs (prepared according to the procedure of Example 1; EEW~226; acid number~290) in the presence of same temperature to give a homogeneous, greyish-purple resin. The resin was then quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 20 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, light grey, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a good adhesive power of about 2.0 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

Example 5

This example describes the preparation of PSA composition from EFAs (EEW, 226; acid number, 290; prepared according to the procedure of Example 1) in the presence of Cr-TAA (Aldrich, 97%), and of PSA tapes (BOPP film as backing material) comprising the composition with the aid of two siliconized release liners with different adhesion-repellence property for the final adhesive composition.

Cr-TAA (0.128 g) and EFAs (6.08 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 130° C., heating and stirring (200 rpm) were continued for 30 minutes at the same temperature to give a homogeneous, greyish-purple resin. The resin was then quickly blade-coated on the siliconised face of a sheet of partially siliconized release liner with a glass rod at a coating level of about 4.3 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 23 minutes in the oven. The fully siliconized released liner was easily peeled off without taking away any adhesive composition; a sheet of BOPP film was immediately and carefully covered on the adhesive layer. The new "sandwich" was then pressed with a rubber roller to achieve sufficient wet-out of the adhesive onto the BOPP backing in order to provide adequate adhesion. After the "sandwich" was cooled down, the partially siliconized release liner could be peeled off with the adhesive composition being completely transferred to the BOPP backing. The siliconized release liner can be optionally left for the protection of the adhesive layers on the BOPP backing or be recovered for re-use. The adhesive coating on the BOPP backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 0.9 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 6

This example describes the preparation of PSA composition from EFAs (EEW, 226; acid number, 290; prepared according to the procedure of Example 1) in the presence of Cr-TAA (Aldrich, 97%), and of PSA tapes (PVC film as backing material) comprising the composition with the aid of two siliconized release liners with different adhesion-repellence property for the final adhesive composition.

Cr-TAA (0.128 g) and EFAs (6.08 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 130° C., heating and stirring (200 rpm) were continued for 90 minutes at the same temperature to give a homogeneous, greyish-purple resin. The resin was then quickly blade-coated on the siliconised face of a sheet of partially siliconized release liner with a glass rod at a coating level of about 5.0 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 22 minutes in the oven. The fully siliconized released liner was easily peeled off without taking away any adhesive composition; a sheet of PVC film was immediately and carefully covered on the adhesive layer. The new "sandwich" was then pressed with a rubber roller to achieve sufficient wet-out of the adhesive onto the PVC backing in order to provide adequate adhesion. After the "sandwich" was cooled down, the partially siliconized release liner could be peeled off with the adhesive composition being completely transferred to the PVC backing. The siliconized release liner can be optionally left for the protection of the adhesive layers on the PVC backing or be recovered for re-use. The adhesive coating on the PVC backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 1.2 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 7

This example describes the preparation of PSA composition from EFAs (prepared according to the procedure of Example 1; EEW~226; acid number~290) and dimer acid (hydrogenated; average Mn~570, dimer acid ≥98%, monomer ≤1%, trimer acid ≤1%) in the presence of AMC-2, and of PSA tapes comprising the composition with the aid of two siliconized release liners with different adhesion-repellence property for the final adhesive composition.

AMC-2 (0.373 g), dimer acid (3.34 g), and EFAs (8.29 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 80° C., heating and stirring (400 rpm) were continued for 40 minutes at the same temperature to give a homogeneous, light green, viscous resin. The resin was then quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 6 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a very good adhesive power of about 2.5 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

Example 8

This example describes the preparation of PSA composition from EFAs (EEW, 226; acid number, 290; prepared according to the procedure of Example 1) and dimer acid (hydrogenated; average Mn~570, dimer acid ≥98%, monomer ≤1%, trimer acid ≤1%) in the presence of AMC-2, and of PSA tapes (BOPP film as backing material) comprising the composition with the aid of two siliconized release liners with different adhesion-repellence property for the final adhesive composition.

AMC-2 (0.364 g), dimer acid (3.28 g), and EFAs (7.85 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 100° C., heating and stirring (200 rpm) were continued for 25 minutes at the same temperature to give a homogeneous, light green, viscous resin. The resin was then quickly blade-coated on the siliconised face of a sheet of partially siliconized release liner with a glass rod at a coating level of about 5 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 10 minutes in the oven. The fully siliconized released liner was easily peeled off without taking away any adhesive composition; a sheet of BOPP film was immediately and carefully covered on the adhesive layer. The new "sandwich" was then pressed with a rubber roller to achieve sufficient wet-out of the adhesive onto the BOPP backing in order to provide adequate adhesion. After the "sandwich" was cooled down, the partially siliconized release liner could be peeled off with the adhesive composition being completely transferred to the BOPP backing. The siliconized release liner can be optionally left for the protection of the adhesive layers on the BOPP backing or be recovered for re-use. The adhesive coating on the BOPP backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 2.2 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 9

This example describes the preparation of PSA composition from EFAs (EEW, 226; acid number, 290; prepared according to the procedure of Example 1) and dimer acid (hydrogenated; average Mn~570, dimer acid ≥98%, monomer ≤1%, trimer acid ≤1%) in the presence of AMC-2, and of PSA tapes (PVC film as backing material) comprising the composition with the aid of two siliconized release liners with different adhesion-repellence property for the final adhesive composition.

AMC-2 (0.364 g), dimer acid (3.28 g), and EFAs (7.85 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 100° C., heating and stirring (200 rpm) were continued for 25 minutes at the same temperature to give a homogeneous, light green, viscous resin. The resin was then quickly blade-coated on the siliconised face of a sheet of partially siliconized release liner with a glass rod at a coating level of about 5 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 10 minutes in the oven. The fully siliconized released liner was easily peeled off without taking away any adhesive composition; a sheet of PVC film was immediately and carefully covered on the adhesive layer. The new "sandwich" was then pressed with a rubber roller to achieve sufficient wet-out of the adhesive onto the PVC backing in order to provide adequate adhesion. After the "sandwich" was cooled down, the partially siliconized release liner could be peeled off with the adhesive composition being completely transferred to the PVC backing. The siliconized release liner can be optionally left for the protection of the adhesive layers on the PVC backing or be recovered for re-use. The adhesive coating on the PVC backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 2.1 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 10

This example describes the preparation of PSA composition from EFAs (EEW, 226; acid number, 290; prepared according to the procedure of Example 1) and dimer acid (hydrogenated; average Mn~570, dimer acid ≥98%, monomer ≤1%, trimer acid ≤1%) in the presence of AMC-2, and of PSA tapes comprising the composition with the aid of two siliconized release liners with different adhesion-repellence property for the final adhesive composition.

AMC-2 (0.136 g) and EFAs (6.35 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 80° C., heating and stirring (200 rpm) were continued for 58 minutes at the same temperature to give a homogeneous, light green, viscous resin. Into the reaction mixture, dimer acid (0.674 g) was then added, and heating and stirring (200 rpm) were continued for another 13 minutes at the same temperature to give a homogeneous, light green, viscous resin. The resin was then quickly blade-coated on the siliconised face of a sheet of partially siliconized release liner with a glass rod at a coating level of about 5 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 3 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a good adhesive power of about 1.4 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

Example 11

This example describes the preparation of PSA composition from EFAs (EEW, 226; acid number, 290; prepared according to the procedure of Example 1) and dimer acid (hydrogenated; average Mn~570, dimer acid ≥98%, monomer ≤1%, trimer acid ≤1%) in the presence of AMC-2, and of PSA tapes (BOPP film as backing material) comprising the composition with the aid of two siliconized release liners with different adhesion-repellence property for the final adhesive composition.

AMC-2 (0.136 g) and EFAs (6.35 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 80° C., heating and stirring (200 rpm) were continued for 58 minutes at the same temperature to give a homogeneous, light green, viscous resin. Into the reaction mixture, dimer acid (0.674 g) was then added, and heating and stirring (200 rpm) were continued for another 13 minutes at the same temperature to give a homogeneous, light green, viscous resin. The resin was then quickly blade-coated on the siliconised face of a sheet of partially siliconized release liner with a glass rod at a coating level of about 5 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 5 minutes in the oven. The fully siliconized released liner was easily peeled off without taking away any adhesive composition; a sheet of BOPP film was immediately and carefully covered on the adhesive layer. The new "sandwich" was then pressed with a rubber roller to achieve sufficient wet-out of the adhesive onto the BOPP backing in order to provide adequate adhesion. After the "sandwich" was cooled down, the partially siliconized release liner could be peeled off with the adhesive composition being completely transferred to the BOPP backing. The siliconized release liner can be optionally left for the protection of the adhesive layers on the BOPP backing or be recovered for re-use. The adhesive coating on the BOPP backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a good adhesive power of about 0.8 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

The shear time to failure for the above sample was determined to be longer than 20 hours according to the Standard Test Method for Shear Adhesion of PSA tapes; the mode of failure is adhesion failure, i.e., the sample was cleanly removed in the test, leaving no adhesive residue on the panel. The internal or cohesive strength of an adhesive film is known as shear. This is a measure of the internal strength of the adhesive itself. Shear properties are typically quantified using the static shear test method. The following procedure describes Standard Test for Shear Adhesion of Pressure-Sensitive Tapes in accordance with Procedure A of ASTM D3654/D3654M-06 (2006). The tests are performed at 23±1° C. and 50±5% RH on a stainless steel substrate (type 302, with bright annealed finish, 2 by 5 inches), using a 1000 gram test mass and 1 inch times 1 inch testing area. An exemplary shear adhesion test of sample tapes consists of following steps:

(1) Clean the test panel three times with acetone and Kimwipe-Clark wipers, and condition the panel for about 10-12 minutes before applying the tape onto the panel.
(2) Randomly cut 3 strips of specimens from each PSA-coated sample sheet. The size of the specimens is 1 inch in width.
(3) Center the test specimen at one end of the test panel and apply, without added pressure, to cover an area exactly 1 by 1 inch, with tape.
(4) Place hook on the free end of the tape specimen, ensuring that the hook extends completely across the width of the specimen and is aligned to uniformly distribute the load.
(5) Place the test assembly in the test stand so that the free end of the test specimen is vertical, ensuring that no peel forces act on the specimen.
(6) Individually prepare each specimen and test within one minute. To start the test, apply the 1000 g mass to the hook gently so as to cause no shear impact force on the tape specimen.
(7) Record the time elapse in which the tape specimen has separated completely from the test panel, and the mode of failure (cohesive failure or adhesion failure).
(8) Repeat the above steps to test the other two strips of specimen, and average the results.

Example 12

This example describes the preparation of PSA composition from EFAs (EEW, 226; acid number, 290; prepared according to the procedure of Example 1) and dimer acid (hydrogenated; average Mn~570, dimer acid ≥98%, monomer ≤1%, trimer acid ≤1%) in the presence of AMC-2, and of PSA tapes (PVC film as backing material) comprising the composition with the aid of two siliconized release liners with different adhesion-repellence property for the final adhesive composition.

AMC-2 (0.136 g) and EFAs (6.35 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 80° C., heating and stirring (200 rpm) were continued for 58 minutes at the same temperature to give a homogeneous, light green, viscous resin. Into the reaction mixture, dimer acid (0.674 g) was then added, and heating and stirring (200 rpm) were continued for another 13 minutes at the same temperature to give a homogeneous, light green, viscous resin. The resin was then quickly blade-coated on the siliconised face of a sheet of partially siliconized release liner with a glass rod at a coating level of about 5 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 5 minutes in the oven. The fully siliconized released liner was easily peeled off without taking away any adhesive composition; a sheet of PVC film was immediately and carefully covered on the adhesive layer. The new "sandwich" was then pressed with a rubber roller to achieve sufficient wet-out of the adhesive onto the PVC backing in order to provide adequate adhesion. After the "sandwich" was cooled down, the partially siliconized release liner could be peeled off with the adhesive composition being completely transferred to the PVC backing. The siliconized release liner can be optionally left for the protection of the adhesive layers on the PVC backing or be recovered for re-use. The adhesive coating on the PVC backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a good adhesive power of about 0.8 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

Example 13

This example describes the preparation of PSA composition from EFAs (prepared according to the procedure of Example 1; EEW~226; acid number~290) and adipic acid (Aldrich, 99%) in the presence of AMC-2, and of PSA tapes comprising the composition with the aid of two siliconized release liners with different adhesion-repellence property for the final adhesive composition.

AMC-2 (0.519 g), adipic acid (1.23 g), and EFAs (12.0 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 100° C., heating and stirring (400 rpm) were continued for 15 minutes at the same temperature to give a homogeneous, light green, viscous resin. The resin was then quickly blade-coated on the siliconised face of a sheet of partially siliconized release liner with a glass rod at a coating level of about 7 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 2.5 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a very good adhesive power of about 2.4 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

Example 14

This example describes the preparation of PSA composition from EFAs (prepared according to the procedure of Example 1; EEW~226; acid number~290) and itaconic acid (Aldrich, 99%) in the presence of AMC-2, and of PSA tapes comprising the composition with the aid of two siliconized release liners with different adhesion-repellence property for the final adhesive composition.

AMC-2 (0.400 g), itaconic acid (1.17 g), and EFAs (12.9 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 100° C., heating and stirring (400 rpm) were continued for 16 minutes at the same temperature to give a homogeneous, light green, viscous resin. The resin was then quickly blade-coated on the siliconised face of a sheet of partially siliconized release liner with a glass rod at a coating level of about 7 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 5 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited an adhesive power of about 1.2 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

Example 15

This example describes the preparation of PSA composition from EFAs (prepared according to the procedure of Example 1) and succinic anhydride (Aldrich, 99%) in the presence of AMC-2, and of PSA tapes comprising the composition with the aid of two siliconized release liners with different adhesion-repellence property for the final adhesive composition.

AMC-2 (0.369 g), succinic anhydride (1.32 g), and EFAs (13.9 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 120° C., heating and stirring (400 rpm) were continued for 5 minutes at the same temperature to give a homogeneous, light green, viscous resin. The resin was then quickly blade-coated on the siliconised face of a sheet of partially siliconized release liner with a glass rod at a coating level of about 7 mg/cm², to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 3.5 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale green, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited an adhesive power of about 0.8 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

Example 16

This example describes the preparation of PSA composition from EFAs (EEW, 226; acid number, 290; prepared according to the procedure of Example 1) and sebacic acid (Aldrich, 98%) in the presence of AMC-2, and of PSA tapes (BOPP film as backing material) comprising the composition with the aid of two siliconized release liners with different adhesion-repellence property for the final adhesive composition.

AMC-2 (0.176 g), sebacic acid (0.431 g), and EFAs (4.13 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 100° C., heating and stirring (200 rpm) were continued for 27 minutes at the same temperature to give a homogeneous, light green, viscous resin. The resin was then quickly blade-coated on the siliconised face of a sheet of partially siliconized release liner with a glass rod at a coating level of about 5 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 7 minutes in the oven. The fully siliconized released liner was easily peeled off without taking away any adhesive composition; a sheet of BOPP film was immediately and carefully covered on the adhesive layer. The new "sandwich" was then pressed with a rubber roller to achieve sufficient wet-out of the adhesive onto the BOPP backing in order to provide adequate adhesion. After the "sandwich" was cooled down, the partially siliconized release liner could be peeled off with the adhesive composition being completely transferred to the BOPP backing. The siliconized release liner can be optionally left for the protection of the adhesive layers on the BOPP backing or be recovered for re-use. The adhesive coating on the BOPP backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 1.4 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 17

This example describes the preparation of PSA composition from EFAs (EEW, 226; acid number, 290; prepared according to the procedure of Example 1) and sebacic acid (Aldrich, 98%) in the presence of AMC-2, and of PSA tapes (PVC film as backing material) comprising the composition with the aid of two siliconized release liners with different adhesion-repellence property for the final adhesive composition.

AMC-2 (0.176 g), sebacic acid (0.431 g), and EFAs (4.13 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 100° C., heating and stirring (200 rpm) were continued for 27 minutes at the same temperature to give a homogeneous, light green, viscous resin. The resin was then quickly blade-coated on the siliconised face of a sheet of partially siliconized release liner with a glass rod at a coating level of about 5 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 5 minutes in the oven. The fully siliconized released liner was easily peeled off without taking away any adhesive composition; a sheet of PVC film was immediately and carefully covered on the adhesive layer. The new "sandwich" was then pressed with a rubber roller to achieve sufficient wet-out of the adhesive onto the PVC backing in order to provide adequate adhesion. After the "sandwich" was cooled down, the partially siliconized release liner could be peeled off with the adhesive composition being completely transferred to the PVC backing. The siliconized release liner can be optionally left for the protection of the adhesive layers on the PVC backing or be recovered for re-use. The adhesive coating on the PVC backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 2.0 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 18

This example describes the preparation of PSA composition from EFAs (EEW, 226; acid number, 290; prepared according to the procedure of Example 1) and phthalic anhydride (Aldrich, 99+%) in the presence of AMC-2, and of PSA tapes (BOPP film as backing material) comprising the composition with the aid of two siliconized release liners with different adhesion-repellence property for the final adhesive composition.

AMC-2 (0.212 g), phthalic anhydride (0.913 g), and EFAs (9.26 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 120° C., heating and stirring (200 rpm) were continued for 10 minutes at the same temperature to give a homogeneous, light green, viscous resin. The resin was then quickly blade-coated on the siliconised face of a sheet of partially siliconized release liner with a glass rod at a coating level of about 5 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 10 minutes in the oven. The fully siliconized released liner was easily peeled off without taking away any adhesive composition; a sheet of BOPP film was immediately and carefully covered on the adhesive layer. The new "sandwich" was then pressed with a rubber roller to achieve sufficient wet-out of the adhesive onto the BOPP backing in order to provide adequate adhesion. After the "sandwich" was cooled down, the partially siliconized release liner could be peeled off with the adhesive composition being completely transferred to the BOPP backing. The siliconized release liner can be optionally left for the protection of the adhesive layers on the BOPP backing or be recovered for re-use. The adhesive coating on the BOPP backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited an adhesive power of about 0.3 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 19

This example describes the preparation of PSA composition from EFAs (EEW, 226; acid number, 290; prepared according to the procedure of Example 1) and phthalic anhydride (Aldrich, 99+%) in the presence of AMC-2, and of PSA tapes (PVC film as backing material) comprising the composition with the aid of two siliconized release liners with different adhesion-repellence property for the final adhesive composition.

AMC-2 (0.212 g), phthalic anhydride (0.913 g), and EFAs (9.26 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 120° C., heating and stirring (200 rpm) were continued for 10 minutes at the same temperature to give a homogeneous, light green, viscous resin. The resin was then quickly blade-coated on the siliconised face of a sheet of partially siliconized release liner with a glass rod at a coating level of about 5 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 10 minutes in the oven. The fully siliconized released liner was easily peeled off without taking away any adhesive composition; a sheet of PVC film was immediately and carefully covered on the adhesive layer. The new "sandwich" was then pressed with a rubber roller to achieve sufficient wet-out of the adhesive onto the PVC backing in order to provide adequate adhesion. After the "sandwich" was cooled down, the partially siliconized release liner could be peeled off with the adhesive composition being completely transferred to the PVC backing. The siliconized release liner can be optionally left for the protection of the adhesive layers on the PVC backing or be recovered for re-use. The adhesive coating on the PVC backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited an adhesive power of about 0.4 lbf/inch on stainless steel (type 302). The 90° peel adhesion test method and conditions are described in Example 3; the sample was cleanly removed in the test, leaving no adhesive residue on the panel. The experimental conditions and 90° peel adhesion test results are shown in Table 1.

Example 20

This example describes the preparation of PSA composition from EOA (prepared according to the procedure of Example 2; EEW~324; acid number~298) and trimethylolpropane triglycidyl ether (TTE; EEW~138~154) in the presence of chromium (III) tris(acetylacetonate) (Cr-TAA; Aldrich, 97%), and of PSA tapes comprising the composition with the aid of two siliconized release liners with different adhesion-repellence property for the final adhesive composition.

Cr-TAA (0.100 g) and EOA (5.0 g) were charged to a 50-mL, round-bottom flask equipped with a silicon oil bath and magnetic stirrer. The resulting mixture was bubbled with nitrogen for two minutes while heating and stirring. After the temperature of the resulting mixture reached 135° C., heating and stirring (400 rpm) were continued for 65 minutes at the same temperature to give a homogeneous, greyish-purple, viscous resin. To the reaction mixture, TTE (0.42 g) was then added, and heating and stirring (400 rpm) were continued for another 5 minutes at the same temperature to give a homogeneous, greyish-purple, viscous resin. The resin was then quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was carefully covered with a sheet of fully siliconized release liner (the siliconized face inwardly), resulting in a "sandwich" which was then pressed with a rubber roller to achieve a good contact between the adhesive composition and the two liners. Subsequently, the "sandwich" was placed in an air-circulating oven maintained at 160° C., and taken out after 35 minutes in the oven. The fully siliconized released liner was easily peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, light grey, shiny, uniform, "dry" adhesive layer of sufficient cohesion strength, and was not found to penetrate the paper backing or give an oily appearance of the PSA tape. The finished PSA tape thus obtained possessed good initial tack, formed ropy structure upon removal of it from surfaces (e.g., metal, lacquer, glass, human skin) to which they are applied, and exhibited a good adhesive power of about 2.4 lbf/inch on stainless steel (type 302). The 90° peel adhesion test procedure and conditions are described in Example 3; the sample was cleanly removed in the test, leaving no adhesive residue on the panel. The experimental conditions and 90° peel adhesion test results are shown in Table 1.

The $T_g$ of the final PSA coating was determined by differential scanning calorimetry (DSC) analysis, which was performed using a TA Instruments DSC Q2000 thermal analytical device. The standard experiment consisted of heating the sample from −80 to 100° C. at 10° C./min followed by a cooling from 100 to −80° C. at the same rate; the cycle was then repeated. From the thermogram of the second heating scan, the midpoint of the glass transition temperature was observed to be −20° C.; the second run is considered more reliable since the first run produces a more uniform sample. The PSA samples after one-week aging in an oven at 60° C. have almost the same $T_g$ as those without aging.

In view of the many possible embodiments to which the principles of the disclosed methods and compositions may be applied, it should be recognized that the illustrated embodiments are only preferred examples of the invention and should not be taken as limiting the scope of the invention.

What is claimed is:

1. A method for making a pressure sensitive adhesive comprising:
   (a) making at least one epoxidized fatty acid from at least one plant oil, marine oil, animal fat, or a mixture thereof; and
   (b) polymerizing the at least one epoxidized fatty acid to produce a pressure sensitive adhesive, wherein the pressure sensitive adhesive product is a polyester.

2. The method of claim 1, wherein polymerizing the at least one epoxidized fatty acid to produce a pressure sensitive adhesive comprises pre-polymerizing the at least one epoxidized fatty acid at a temperature of 20 to 300° C. for 1 to 180 minutes, and then polymerizing the resulting prepolymer at a temperature of 100 to 300° C. for 10 seconds to 100 minutes.

3. The method of claim 1, wherein polymerizing the at least one epoxidized fatty acid to produce a pressure sensitive adhesive comprises pre-polymerizing the at least one epoxidized fatty acid by reacting the at least one epoxidized fatty acid with (i) at least one carboxylic acid compound having at least two carboxylic acid groups or (ii) at least one epoxide having at least two epoxy groups.

4. The method of claim 3, further comprising polymerizing the resulting prepolymer at a temperature of 100 to 300° C. for 10 seconds to 100 minutes.

5. The method of claim 3, wherein the carboxylic acid compound comprises a dibasic acid or an anhydride thereof.

6. The method of claim 3, wherein the epoxide compound is selected from an aliphatic triglycidyl or polyglycidyl ether, an aromatic triglycidyl or polyglycidyl ether, epoxy functionalized polybutadiene, alkyl diglycidyl ether, an alkyl diglycidyl ester, epoxidized fatty acid ester, epoxidized plant oil, epoxidized marine oil, or a bisphenol diglycidyl ether.

7. The method of claim 3, further comprising applying the prepolymer onto a backing substrate or a release liner and heating the reaction product on the backing substrate or release liner at a temperature of 100-300° C. for 10 seconds to 100 minutes.

8. The method of claim 1, wherein polymerizing the at least one epoxidized fatty acid to produce a pressure sensitive adhesive comprises pre-polymerizing the at least one epoxidized fatty acid, and co-polymerizing and/or curing the prepolymer with (i) at least one carboxylic acid compound having at least two carboxylic acid groups or (ii) at least one epoxide having at least two epoxy groups.

9. The method of claim 1, wherein the at least one epoxidized fatty acid is made from a plant oil.

10. The method of claim 1, comprising epoxidizing the plant oil, marine oil, or ester of unsaturated fatty acid to produce a first intermediate product, saponifying the first intermediate product to produce a second intermediate product, and acidifying the second intermediate product to produce the at least one epoxidized fatty acid.

11. The method of claim 1, wherein the epoxidized fatty acid has a structure of R—$X_1$—R—$X_2$—R—$X_3$—R—C(=O)—OH, wherein $X_1$, $X_2$, and $X_3$ each independently represent

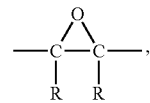

or a substituted or unsubstituted alkyl or heteroalkyl group, provided at least one of $X_1$, $X_2$, or $X_3$ is

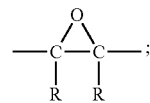

and each R independently represents hydrogen or a substituted or unsubstituted alkyl or heteroalkyl group.

12. The method of claim 1, wherein the plant oil is soybean oil.

13. The method of claim 1, wherein the polyester is a cross-linked hydroxy-functional polyester.

14. A method for making a pressure sensitive adhesive comprising:
   (a) making epoxidized oleic acid, an epoxidized linoleic acid (including fully and partially epoxidized linoleic acid), or an epoxidized linolenic acid (including fully and partially epoxidized linolenic acid) from at least one plant oil, marine oil, animal fat, or making a mixture thereof; and
   (b) polymerizing the epoxidized oleic acid, the epoxidized linoleic acid, the epoxidized linolenic acid, or the mixture thereof to produce a pressure sensitive adhesive, wherein the pressure sensitive adhesive product is a polyester.

15. The method of claim 14, comprising saponifying the vegetable, marine oil, or ester of unsaturated fatty acid to produce a first intermediate product, acidifying the first intermediate product to produce a second intermediate product, and epoxidizing the second intermediate product to produce the at least one epoxidized fatty acid.

16. The method of claim 14, wherein making an epoxidized oleic acid, an epoxidized linoleic acid, or epoxidized linolenic acid from a plant oil, marine oil, other ester of unsaturated fatty acid, or making the mixture thereof, comprises alkanolysis of the plant, marine oil, or other ester of unsaturated fatty acid to produce a first intermediate product, epoxidization of the first intermediate product to produce a second intermediate product, and saponification and acidification of the second intermediate product to produce the epoxidized oleic acid, the epoxidized linoleic acid, the epoxidized linolenic acid, or the mixture thereof.

17. The method of claim 14, wherein polymerizing the epoxidized oleic acid, the epoxidized linoleic acid, the epoxidized linolenic acid, or the mixture thereof to produce a pressure sensitive adhesive comprises pre-polymerizing the epoxidized oleic acid, the epoxidized linoleic acid, the epoxidized linolenic acid, or the mixture thereof with (i) at least one carboxylic acid compound having at least two carboxylic acid groups or (ii) at least one epoxide having at least two epoxy groups.

18. The method of claim 14, wherein polymerizing the epoxidized oleic acid, the epoxidized linoleic acid, the epoxidized linolenic acid, or the mixture thereof to produce a pressure sensitive adhesive comprises pre-polymerizing the epoxidized oleic acid, the epoxidized linoleic acid, the epoxidized linolenic acid, or the mixture thereof, and co-polymerizing and/or curing the prepolymer with (i) at least one carboxylic acid compound having at least two carboxylic acid groups or (ii) at least one epoxide having at least two epoxy groups.

19. The method of claim 14, wherein the polyester is a cross-linked hydroxy-functional polyester.

20. A method for making a pressure sensitive adhesive construct comprising:
making at least one epoxidized fatty acid from at least one plant oil, marine oil, animal fat, or a mixture thereof; and
forming on a backing substrate a pressure sensitive adhesive from the resulting at least one epoxidized fatty acid, wherein the pressure sensitive adhesive is a polyester.

21. The method of claim 20, wherein the forming of the pressure sensitive adhesive on the backing substrate comprises pre-polymerizing the at least one epoxidized fatty acid, applying the prepolymer to the backing substrate, and further polymerizing and/or thermally curing the prepolymer on the substrate.

22. The method of claim 21, wherein
the prepolymer is applied onto a release liner or a backing substrate;
a backing substrate is placed onto a surface of the prepolymer coating opposing the release liner, or a release liner is placed on a surface of the prepolymer coating opposing the backing substrate, to form a release liner/prepolymer/backing substrate assembly;
pressure is applied to the resulting assembly; and
at least the prepolymer on the backing substrate or release liner is heated to produce the pressure sensitive adhesive.

23. The method of claim 21, wherein the method comprises:
applying the prepolymer onto a first release liner;
placing a second release liner onto a surface of the prepolymer coating opposing the first release liner to form a first release liner/prepolymer/second release liner assembly;
applying pressure to the resulting assembly;
heating the resulting assembly to form a pressure sensitive adhesive from the prepolymer;
removing the second release liner; and
placing a backing substrate onto a surface of the pressure sensitive adhesive coating opposing the first release liner to form a first release liner/pressure sensitive adhesive/backing substrate assembly.

24. The method of claim 20, wherein the forming of the pressure sensitive adhesive on the backing substrate comprises pre-polymerizing the at least one epoxidized fatty acid by reacting the at least one epoxidized fatty acid with (i) at least one carboxylic acid compound having at least two carboxylic acid groups or (ii) at least one epoxide having at least two epoxy groups, applying the prepolymer to the backing substrate, and further polymerizing and/or thermally curing the prepolymer on the substrate.

25. The method of claim 20, wherein the forming of the pressure sensitive adhesive on the backing substrate comprises pre-polymerizing the at least one epoxidized fatty acid, co-polymerizing the prepolymer with (i) at least one carboxylic acid compound having at least two carboxylic acid groups or (ii) at least one epoxide having at least two epoxy groups, applying the copolymer to the backing substrate and, further polymerizing and/or thermally curing the copolymer on the substrate.

26. The method of claim 20, wherein the polyester is a cross-linked hydroxy-functional polyester.

27. A method for making a pressure sensitive adhesive construct comprising:
making an epoxidized oleic acid, an epoxidized linoleic acid, or epoxidized linolenic acid from at least one plant oil, marine oil, or animal fat, or making a mixture thereof; pre-polymerizing the resulting epoxidized oleic acid, epoxidized linoleic acid, epoxidized linolenic acid, or mixture thereof; and
forming on a backing substrate a pressure sensitive adhesive from the prepolymer, wherein the pressure sensitive adhesive is a polyester.

28. The method of claim 27, wherein the forming of the pressure sensitive adhesive on the backing substrate comprises pre-polymerizing the epoxidized oleic acid, the epoxidized linoleic acid, the epoxidized linolenic acid, or the mixture thereof with (i) at least one carboxylic acid compound having at least two carboxylic acid groups or (ii) at least one epoxide having at least two epoxy groups, applying the prepolymer to the backing substrate and, further polymerizing and/or thermally curing the prepolymer on the substrate.

29. The method of claim 27, wherein the forming of the pressure sensitive adhesive on the backing substrate comprises pre-polymerizing the epoxidized oleic acid, the epoxidized linoleic acid, the epoxidized linolenic acid, or the mixture thereof, co-polymerizing the prepolymer with (i) at least one carboxylic acid compound having at least two carboxylic acid groups or (ii) at least one epoxide having at least two epoxy groups, applying the copolymer to the backing substrate and, further polymerizing and/or thermally curing the copolymer on the substrate.

30. The method of claim 27, wherein the polyester is a cross-linked hydroxy-functional polyester.

* * * * *